United States Patent
Iwakura

(10) Patent No.: US 9,553,795 B2
(45) Date of Patent: Jan. 24, 2017

(54) PORT SWITCHING METHOD, ANALYSIS DEVICE, AND RECORDING MEDIUM

(71) Applicant: FUJITSU LIMITED, Kawasaki-shi, Kanagawa (JP)

(72) Inventor: Hirokazu Iwakura, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/278,204

(22) Filed: May 15, 2014

(65) Prior Publication Data

US 2014/0348163 A1 Nov. 27, 2014

(30) Foreign Application Priority Data

May 22, 2013 (JP) .................. 2013-108420

(51) Int. Cl.
| | |
|---|---|
| H04L 12/56 | (2006.01) |
| H04L 12/28 | (2006.01) |
| H04L 12/761 | (2013.01) |
| H04L 12/931 | (2013.01) |
| H04L 12/939 | (2013.01) |

(52) U.S. Cl.
CPC ............ *H04L 45/16* (2013.01); *H04L 49/208* (2013.01); *H04L 49/552* (2013.01)

(58) Field of Classification Search
CPC ....... H04L 45/16; H04L 49/208; H04L 49/552
USPC .......................................... 370/351, 389, 390
See application file for complete search history.

(56) References Cited

U.S. PATENT DOCUMENTS

| | | | | |
|---|---|---|---|---|
| 7,760,636 B1* | 7/2010 | Cheriton | ............... | H04L 1/1874 370/230 |
| 2002/0054595 A1* | 5/2002 | Ambe | ..................... | H04L 12/46 370/390 |
| 2003/0120806 A1* | 6/2003 | Clune | ................... | H04L 12/185 709/238 |
| 2005/0254490 A1* | 11/2005 | Gallatin | .............. | H04L 12/4645 370/389 |
| 2006/0010299 A1* | 1/2006 | Zhang | ................. | H04L 67/1097 711/162 |
| 2007/0022327 A1* | 1/2007 | Otsuka | ................ | G06F 11/3419 714/47.2 |

(Continued)

FOREIGN PATENT DOCUMENTS

| | | |
|---|---|---|
| JP | 2003-525000 | 8/2003 |
| JP | 2013-030944 | 2/2013 |
| WO | WO 01/63838 | 8/2001 |

*Primary Examiner* — Khaled Kassim
*Assistant Examiner* — Berhanu Belete
(74) *Attorney, Agent, or Firm* — Staas & Halsey LLP

(57) ABSTRACT

A port switching method performed by a processor included in an analysis device coupled to a first port and a second port which are included in at least one of a plurality of switches, the port switching method includes receiving a first copy packet from the first port; determining whether the first copy packet succeeded a second copy packet based on sequence information of the first copy packet, and based on sequence information of a second copy packet received before the receiving; specifying a target port outputted the first copy packet to the first port, the target port being included in a target switch among the plurality of switches when it is determined that the first copy packet did not succeed the second copy packet; and causing the target switch to transmit, from the target port, a third copy packet generated at the target switch to the second port.

16 Claims, 24 Drawing Sheets

(56) References Cited

U.S. PATENT DOCUMENTS

| | | | | |
|---|---|---|---|---|
| 2007/0160073 | A1* | 7/2007 | Toumura | H04L 43/028 370/419 |
| 2009/0010169 | A1* | 1/2009 | Tamura | H04L 43/0882 370/241 |
| 2010/0080246 | A1* | 4/2010 | Iwakura | H04L 12/5693 370/473 |
| 2011/0206055 | A1* | 8/2011 | Leong | H04L 49/00 370/401 |
| 2012/0257627 | A1* | 10/2012 | Nguyen | H04L 49/208 370/392 |
| 2013/0254487 | A1* | 9/2013 | Tanaka | H04L 49/552 711/123 |
| 2013/0347103 | A1* | 12/2013 | Veteikis | H04L 43/04 726/22 |

* cited by examiner

FIG. 5

| L4 TYPE | TRANSMISSION-DESTINATION IP ADDRESS | TRANSMISSION-DESTINATION PORT NUMBER |
|---|---|---|
| TCP | 10.1.1.1 | 80 |
| TCP | 10.1.1.2 | 8002 |
| ⋮ | ⋮ | ⋮ |
| UDP | 11.1.1.1 | 8080 |

| 56A | 56B | 56C | 56D | 56E | 56F | 56G | 56H | 56J | 56K |
|---|---|---|---|---|---|---|---|---|---|
| L4 TYPE | TRANSMISSION-DESTINATION IP ADDRESS | TRANSMISSION-DESTINATION PORT NUMBER | TRANSMISSION-SOURCE IP ADDRESS | TRANSMISSION-SOURCE PORT NUMBER | PACKET DISCARD FLAG | INPUT SWITCH NAME | SEQUENCE NUMBER | MESSAGE LENGTH | RECEIVED MESSAGE LENGTH |
| TCP | 10.1.1.1 | 80 | 1.1.1.1 | 10000 | 0 | SW1 | 1 | | |
| TCP | 10.1.1.2 | 8002 | 1.1.1.2 | 20000 | 1 | SW1 | 2 | | |
| ... | ... | ... | ... | ... | ... | ... | ... | ... | ... |
| UDP | 10.1.1.10 | 8080 | 1.1.10.2 | 30000 | 0 | SW2 | | 4500 | 300 |

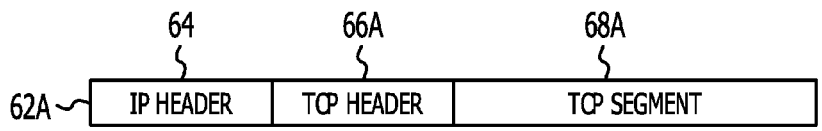

FIG. 9B

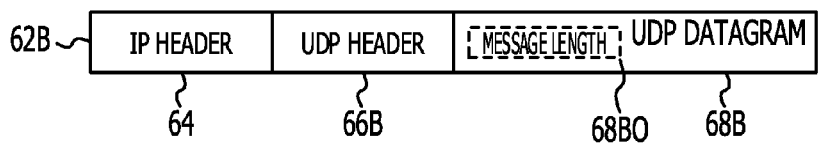

FIG. 9C

| 64 ⤳ | VERSION | HEADER LENGTH | SERVICE TYPE | DATAGRAM LENGTH | |
|---|---|---|---|---|---|
| | IDENTIFIER | | | FLAG | FRAGMENT OFFSET |
| | SURVIVAL TIME | | PROTOCOL | HEADER CHECKSUM | |
| | TRANSMISSION-SOURCE IP ADDRESS ||||| 
| | TRANSMISSION-DESTINATION IP ADDRESS ||||| 
| | OPTION |||| PADDING |

FIG. 9D

| 66A ⤳ | TRANSMISSION-SOURCE PORT NUMBER | | | TRANSMISSION-DESTINATION PORT NUMBER |
|---|---|---|---|---|
| | SEQUENCE NUMBER ||||
| | ACKNOWLEDGE PACKET ||||
| | HEADER LENGTH | RESERVATION BIT | FLAG | WINDOW SIZE |
| | CHECKSUM ||| URGENT POINTER |
| | OPTION ||| PADDING |

FIG. 9E

| 66B ⤳ | TRANSMISSION-SOURCE PORT NUMBER | TRANSMISSION-DESTINATION PORT NUMBER |
|---|---|---|
| | DATA LENGTH | CHECKSUM |

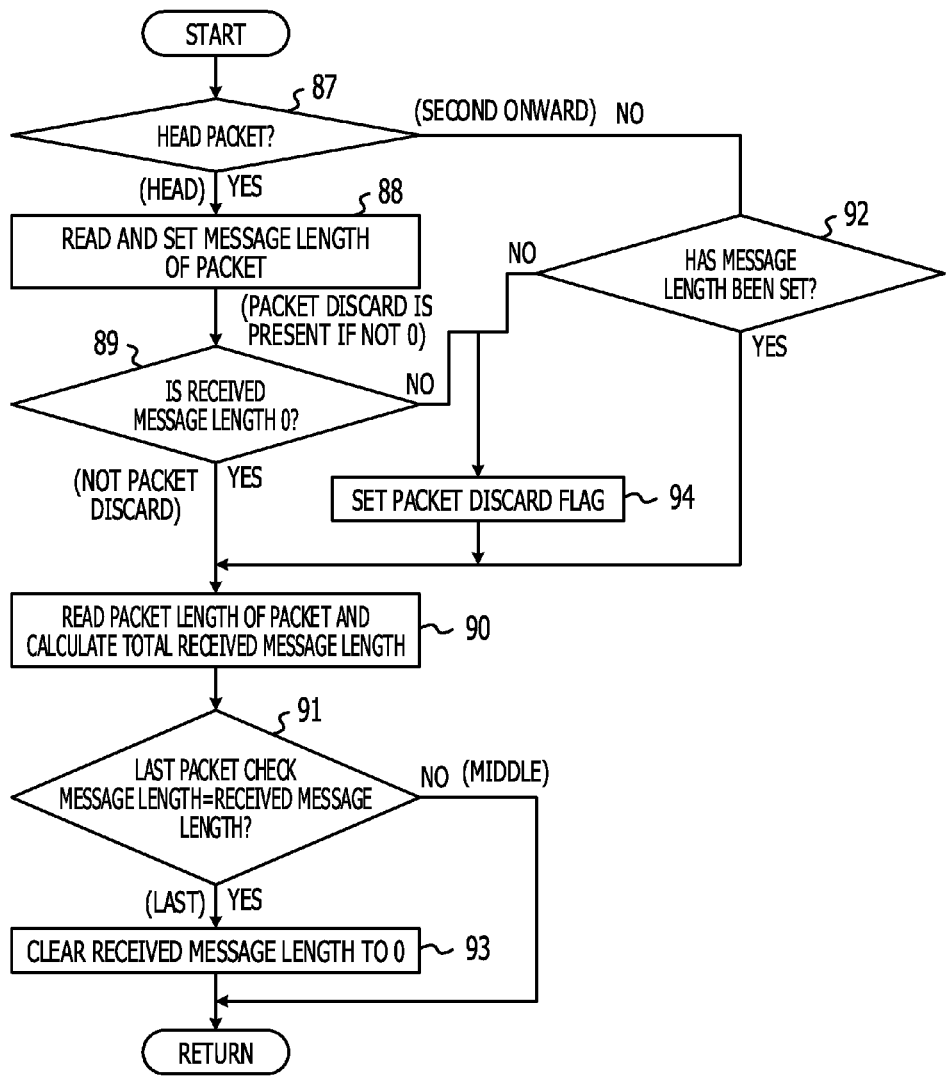

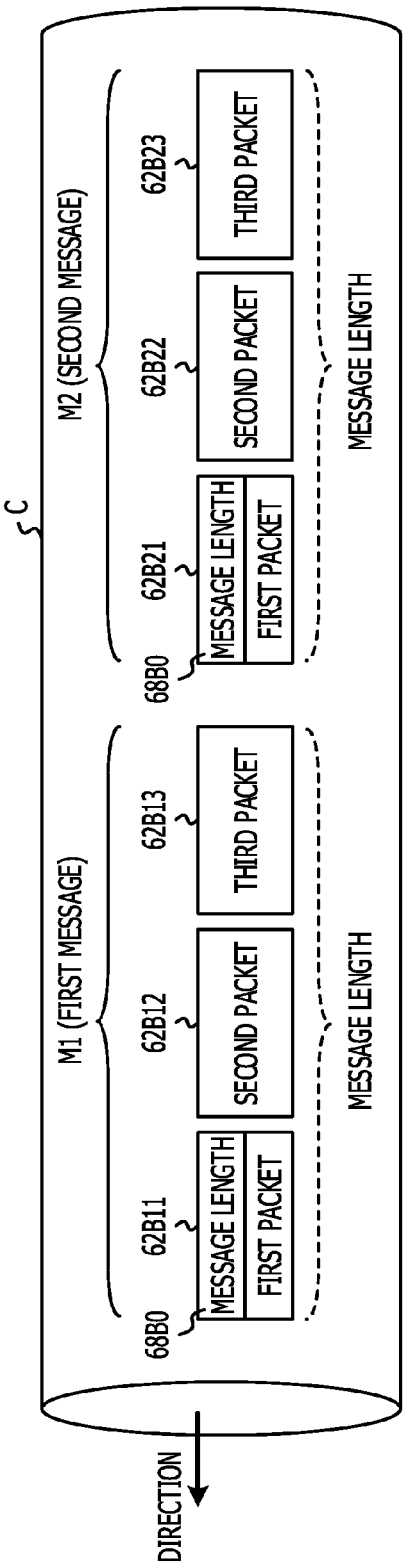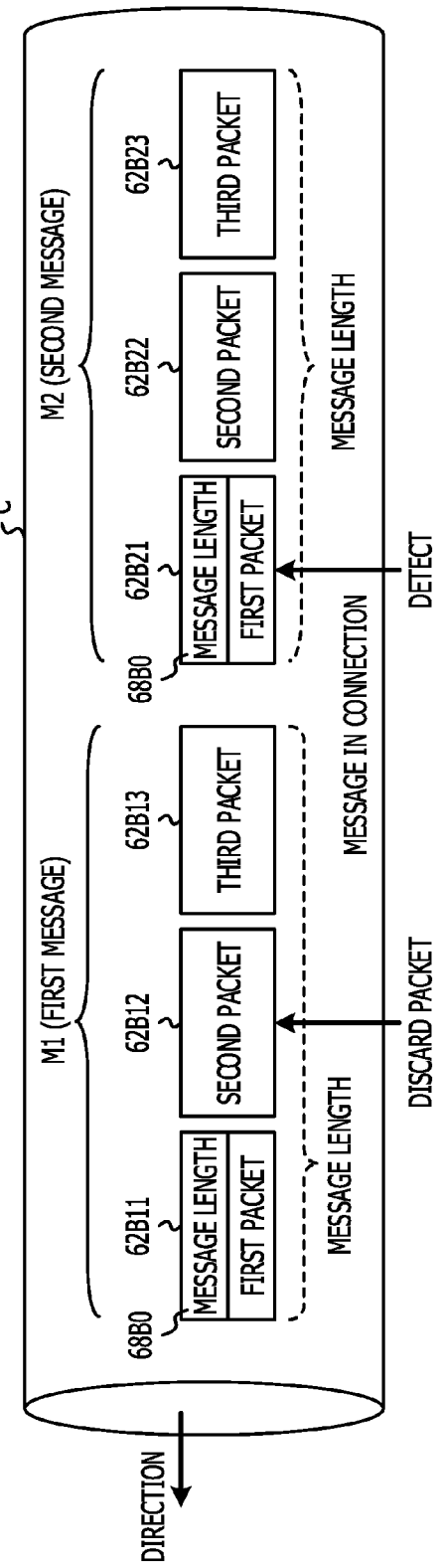

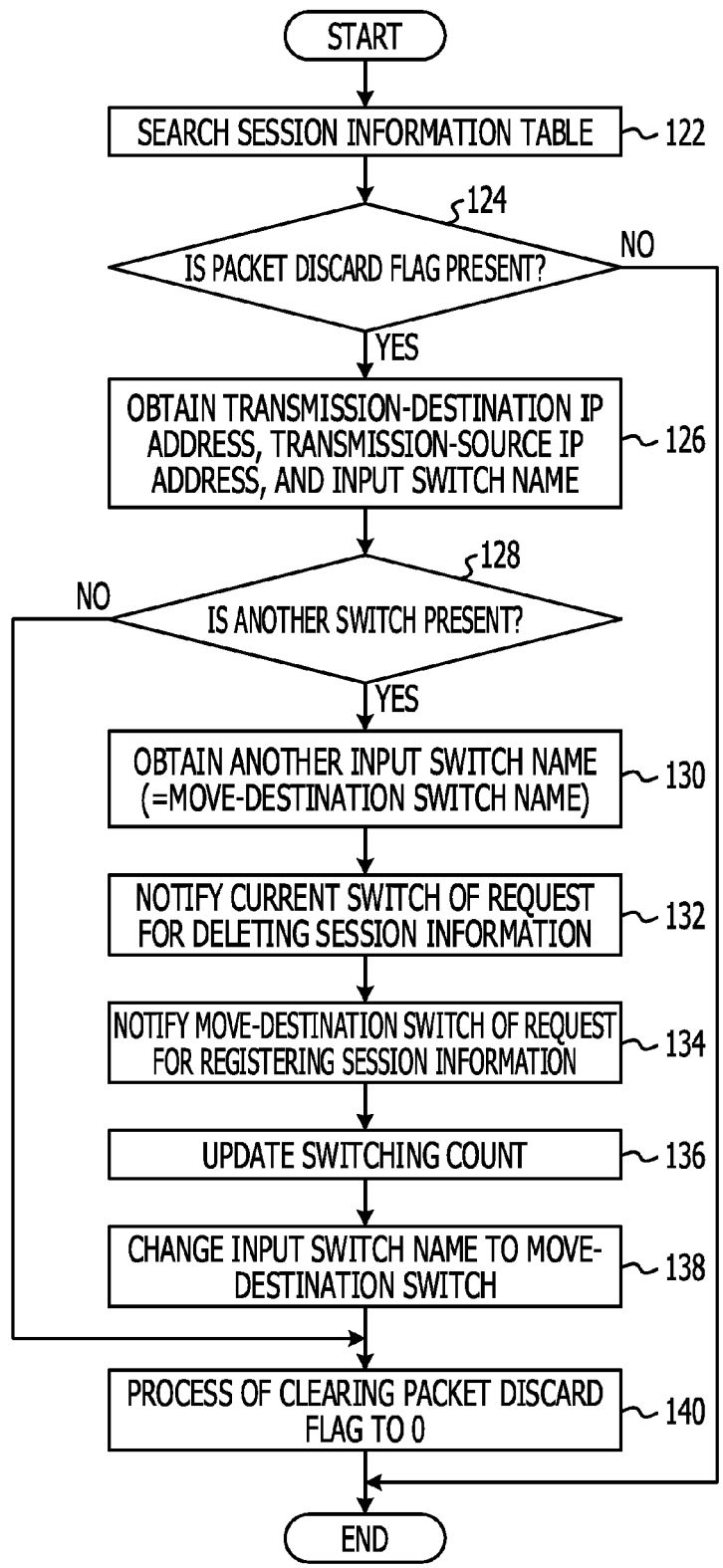

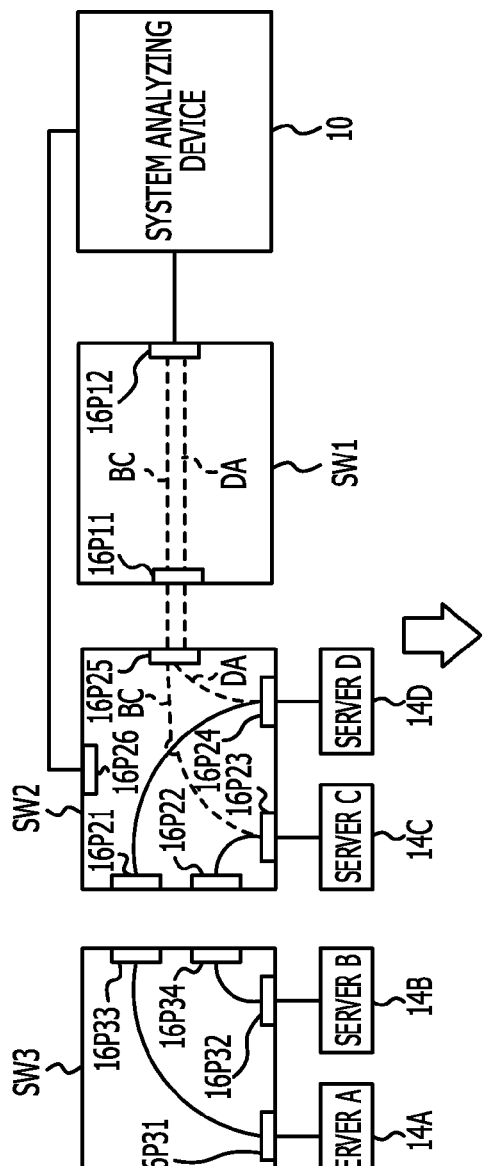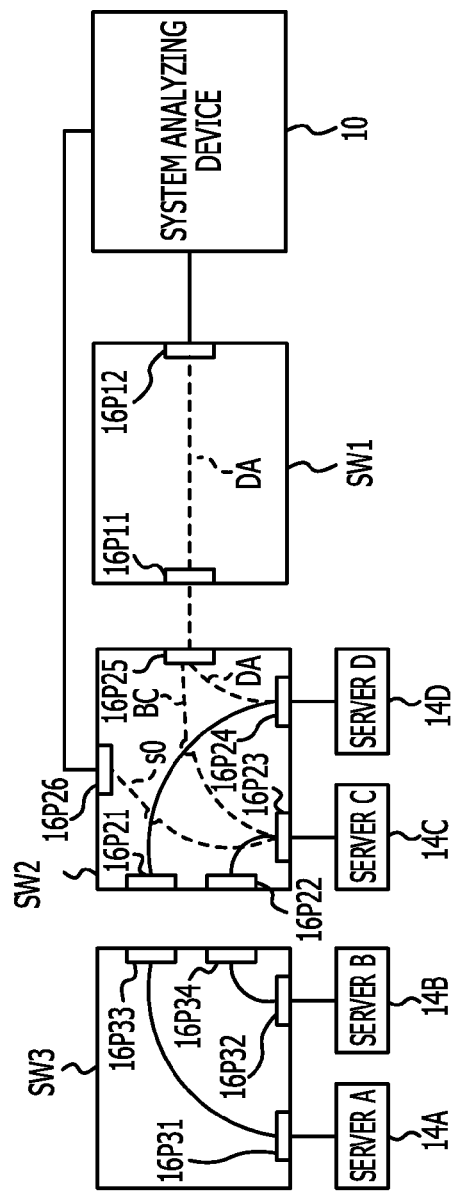
FIG. 21A
FIG. 21B

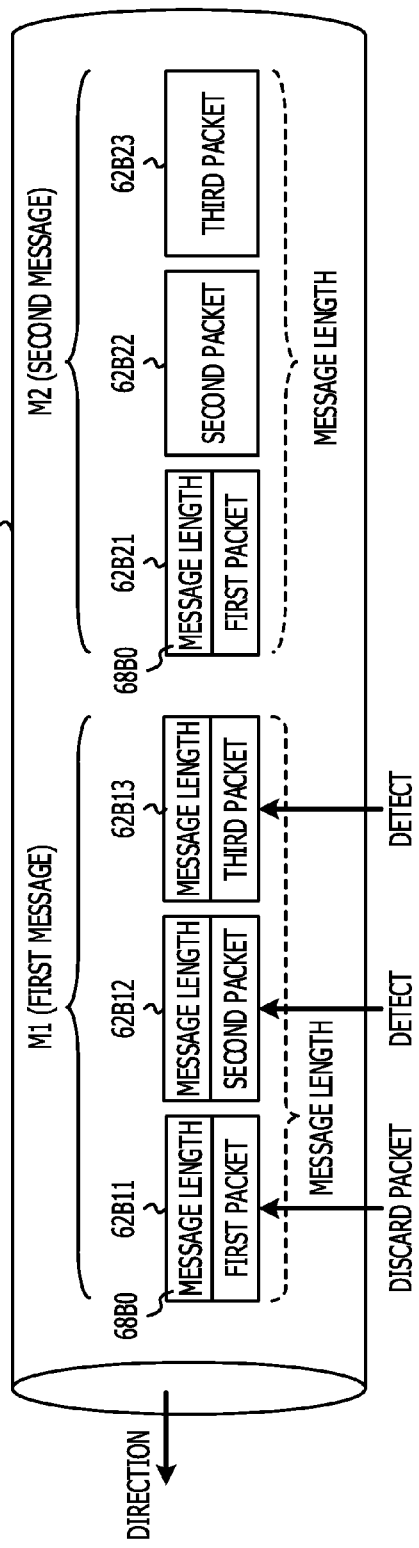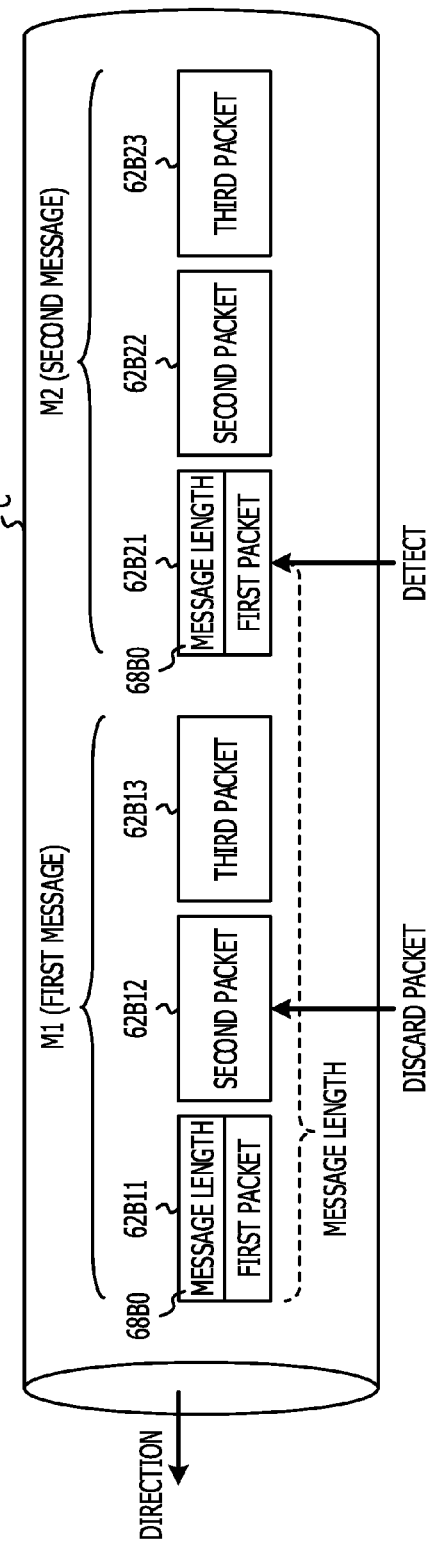

PORT SWITCHING METHOD, ANALYSIS DEVICE, AND RECORDING MEDIUM

CROSS-REFERENCE TO RELATED APPLICATION

This application is based upon and claims the benefit of priority of the prior Japanese Patent Application No. 2013-108420, filed on May 22, 2013, the entire contents of which are incorporated herein by reference.

FIELD

The embodiment discussed herein is related to a port switching method, an analysis device, and a recording medium.

BACKGROUND

In related art, a system analyzing device analyzes the state of packet communication in a system including a plurality of servers for packet communication and a switch for transferring a packet between the plurality of servers. For example, as depicted in FIG. 24A, a system analyzing device 100 analyzes packet communication between a server A 114A and a server B 114B via a switch 120SW.

Here, the switch 120SW has three ports 116P1 to 116P3. The server A 114A is connected to the port 116P1 of the switch 120SW. The server B 114B is connected to the port 116P2 of the switch 120SW. Packet communication between the server A 114A and the server B 114B is performed via the ports 116P1 and 116P2 of the switch 120SW.

The system analyzing device 100 sets the following mirroring to the switch 120SW in order to analyze packet communication between the server A 114A and the server B 114B. That is, the port 116P2, which is one of the ports 116P1 and 116P2 of the switch 120SW where packet communication is performed between the server A 114A and the server B 114B, is first set as a target port. The port 116P3, which is other than ports 116P1 and 116P2 and connected to the analyzing device 100, is set as an output port. A packet passing through the target port 116P2 is copied, and the generated packet is transmitted to the system analyzing device 100 via the output port 116P3.

Here, when packet communication is performed between the server A 114A and the server B 114B, a packet in this communication is copied when passing through the target port 116P2, and the packet generated by copying is outputted to the analyzing device 100 via the output port 116P3.

In the above example, communication between two servers A 114A and B 114B is described. In practice, however, communication is performed between more servers via a plurality of switches. FIG. 24B depicts an example in which communication is performed among three servers A 114A and C 114C via two switches 120SW1 and 120SW2. In this example, in mirroring of communication between the server B 114B and the server C 114C, a port 116P13 is set as a target port. In mirroring of communication between the server A 114A and the server B 114B, a port 116P11 is set as a target port. When a packet passing through these ports 116P11 and 116P13 is copied, and the packet generated by copying is transmitted to the system analyzing device 100 via an output port 116P14.

As related art, for example, Japanese National Publication of International Patent Application No. 2003-525000 and Japanese Laid-open Patent Publication No. 2013-30944 are disclosed.

However, when a packet is transferred, a port temporarily stores the received packet, and then transfers the stored packet. The port has a defined limit regarding a temporarily-storable packet data amount. Therefore, if copies of packets passing through the port 116P11 and the port 116P13 temporarily concentrate on the output port 116P14, any of the packets exceeding the limit is not stored in the output port 116P14 but discarded. The discarded packet is not outputted to the system analyzing device. If this situation continues, the system analyzing device may not be able to accurately analyze the state of packet communication on a packet-discarded side.

SUMMARY

According to an aspect of the invention, a port switching method performed by a processor included in an analysis device coupled to a first port and a second port, each of the first port and the second port being included in at least one of a plurality of switches, the plurality of switches being capable of copying a packet to generate a copy packet, the port switching method includes receiving a first copy packet from the first port; determining whether the first copy packet succeeded a second copy packet based on sequence information of the first copy packet, and based on sequence information of a second copy packet received before the receiving; specifying a target port outputted the first copy packet to the first port, the target port being included in a target switch among the plurality of switches when it is determined that the first copy packet did not succeed the second copy packet; and causing the target switch to transmit, from the target port, a third copy packet generated at the target switch to the second port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of an initial setting table provided in a storage device of the system analyzing device;

FIG. 7 is a diagram of a session information table provided in the storage device of the system analyzing device;

FIG. 9A is a diagram of details of data of a packet following TCP;

FIG. 9B is a diagram of details of data of a packet following UDP;

FIG. 9C is a diagram of an IP header;

FIG. 9D is a diagram of a TCP header;

FIG. 9E is a diagram of a UDP header;

FIG. 12 is a flowchart of an example of a discard detection and setting process for a packet following UDP;

FIG. 13A is a diagram depicting the state of transmission of a packet following UDP;

FIG. 13B is a diagram depicting the state in which a second packet among packets in a first message is discarded and a head packet of the following second message is detected;

FIG. 14 is a flowchart of an example of a first periodic process;

FIG. 21A and FIG. 21B are block diagrams of a modification example 1-4;

FIG. 23A is a diagram depicting the state in which a head packet is discarded among packets of the first message;

FIG. 23B is a diagram depicting the state in which a last packet of the first message is discarded;

DESCRIPTION OF EMBODIMENT

An example of an embodiment of the disclosed art is described in detail below with reference to the drawings.

Figure 1:
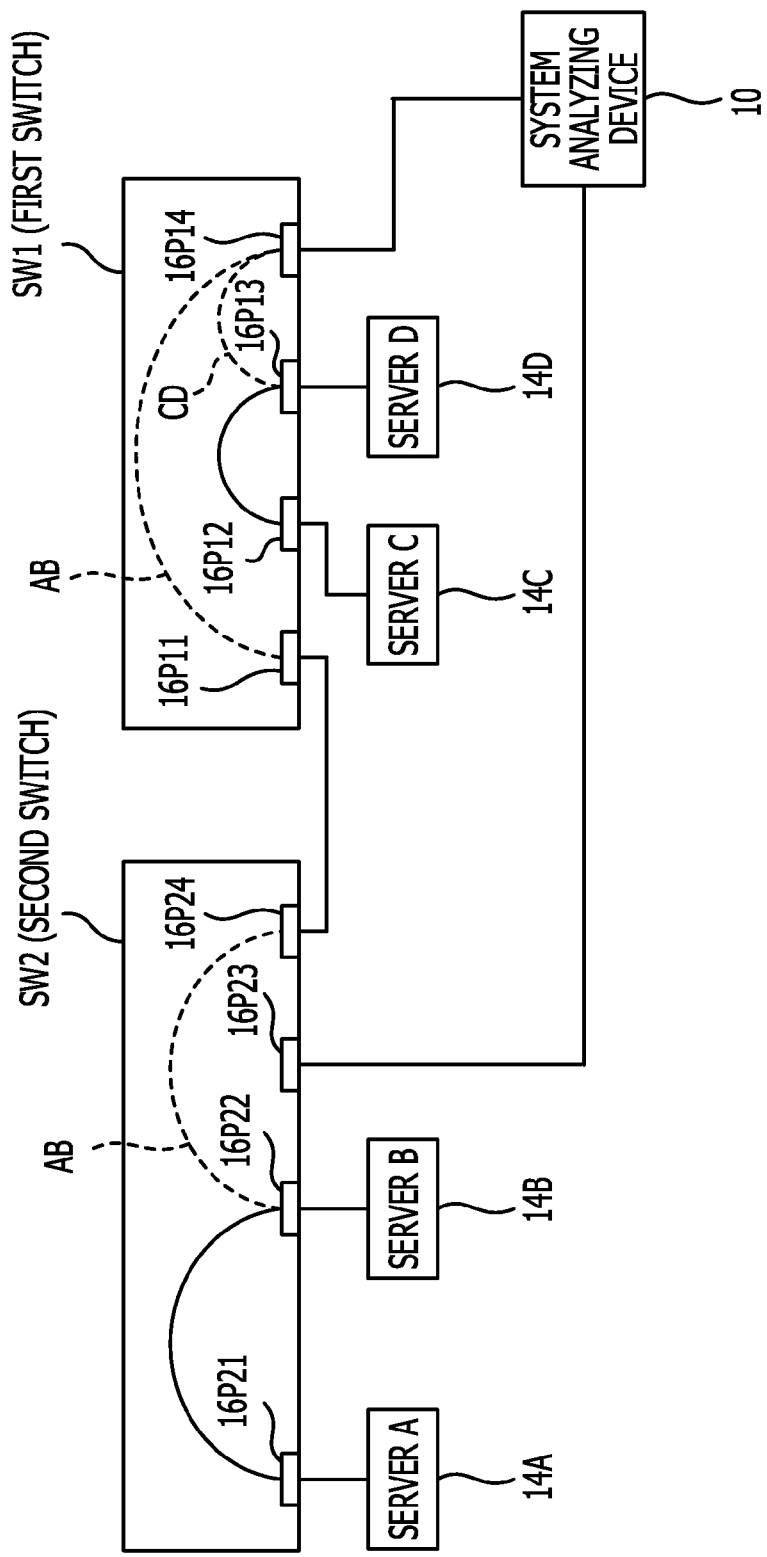
FIG. 1 is a diagram depicting a system having two switches and four servers and an analyzing device for analyzing communication in the system.

FIG. 1 depicts a system including two switches, a first switch SW1 and a second switch SW2, four server devices (hereinafter referred to as "servers") A 14A, B 14B, C 14C, and D 14D. In FIG. 1, a system analyzing device 10 for analyzing packet communication in this system is depicted. As depicted in FIG. 1, the server C 14C and the server D 14D are connected to the first switch SW1, and the server A 14A and the server B 14B are connected to the second switch SW2. The system analyzing device 10 is connected to each of the first switch SW1 and the second switch SW2.

The first switch SW1 and the second switch SW2 are an example of a "transfer device". Four servers A 14A, B 14B, C 14C, and D 14D are an example of "a plurality of server devices". The system is an example of a "network system" in the disclosed art. The system analyzing device 10 is an example of an "analyzing device".

The first switch SW1 is provided with four ports 16P11 to 16P14. The server C 14C is connected to the port 16P12. The server D 14D is connected to the port 16P13. The server C 14C and the server D 14D perform packet communication via the port 16P12 and the port 16P13. In the port 16P13, a packet passing through that port is copied, that is, the port 16P13 is set by the system analyzing device 10 as a mirroring target port. The system analyzing device 10 is connected to the port 16P14.

The second switch SW2 is provided with four ports 16P21 to 16P24. The server A 14A is connected to the port 16P21, and the server B 14B is connected to the port 16P22. The server A 14A and the server B 14B perform packet communication via the port 16P21 and the port 16P22. The port 16P22 is set by the system analyzing device 10 as a mirroring target port. The system analyzing device 10 is connected to the port 16P23.

The port 16P11 of the first switch SW1 and the port 16P24 of the second switch SW2 are connected to each other. The port 16P14 of the first switch SW1 is set by the system analyzing device 10 as an output port so that a packet passing through the port set as a mirroring target port in the first switch SW1 is copied and the generated packet is outputted to the system analyzing device 10. Thus, the packet generated by copying the packet passing through the mirroring target port 16P13 is outputted to the port 16P14. The second switch SW2 is set by the system analyzing device 10 so that a packet generated by copying a packet passing through the mirroring target port 16P22 is transmitted to the port 16P14 via the ports 16P24 and the 16P11. As such, a packet generated by copying a packet passing through the port 16P13 and a packet generated by copying a packet passing through the port 16P22 are inputted to the port 16P14. The port 16P14 temporarily stores the inputted packets, and transmits the stored packets to the system analyzing device 10. The packet data amount temporarily storable in the port 16P14 is, for example, 100 M bits per second (bps).

Figure 2:
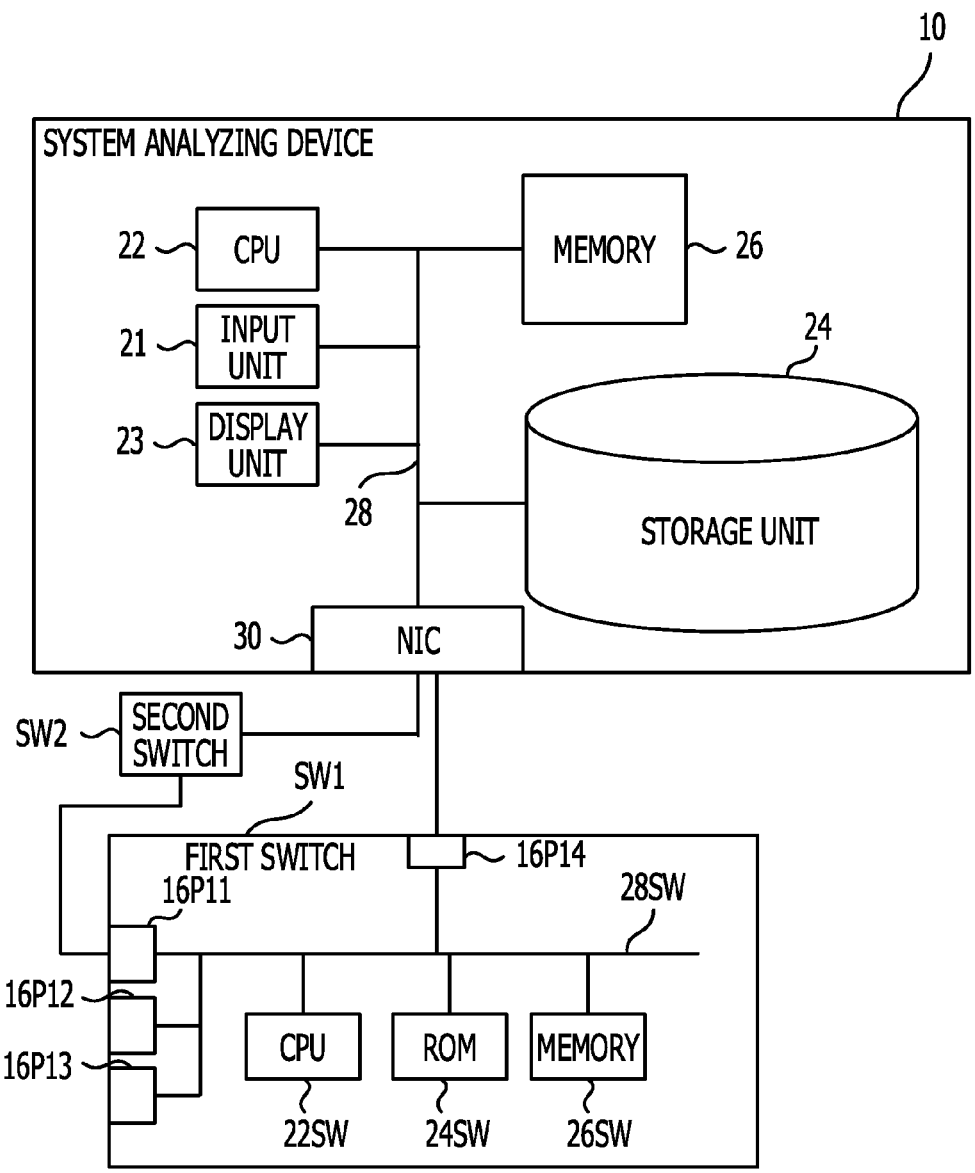
FIG. 2 is a block diagram of a first switch and a second switch of the system analyzing device.

FIG. 2 is a block diagram of the system analyzing device 10 of the first switch SW1 and the second switch SW2. As depicted in FIG. 2, in the system analyzing device 10, a central processing unit (CPU) 22, an input unit 21, and a display unit 23 are mutually connected to one another via a bus 28. To the bus 28, a memory 26, a storage device 24, and a network interface card (NIC) 30 are further connected. In the storage device 24, an analysis program (FIG. 3A) and various tables (FIG. 4, FIG. 5, FIG. 7, and FIG. 8) are stored, which will be described further below.

The server A 14A, the server B 14B, the server C 14C, and the server D 14D each have a structure similar to that of the system analyzing device 10, and therefore description of the structure is omitted herein.

The NIC 30 is an example of a "receiving unit". The CPU 22 is an example of a "control unit".

Since the structure of the first switch SW1 and the structure of the second switch SW2 are similar to each other, only the structure of the first switch SW1 is described, and description of the structure of the second switch SW2 is omitted herein. The first switch SW1 includes a CPU 22SW, a ROM 24SW, and a memory 26SW. The CPU 22SW, the ROM 24SW, and the memory 26SW are mutually connected to one another via a bus 28SW. To the bus 28SW, the port 16P11, the port 16P12, the port 16P13, and the port 16P14 are connected. In the memory 26SW, a session definition table 54 (FIG. 6) is stored, which will be described further below.

Figure 3A:
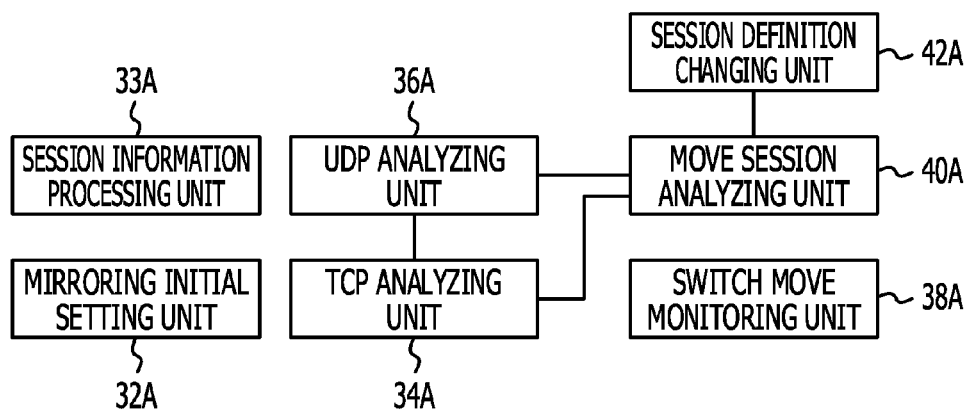
FIG. 3A is a diagram of an analysis program of the system analyzing device.
Figure 3B:
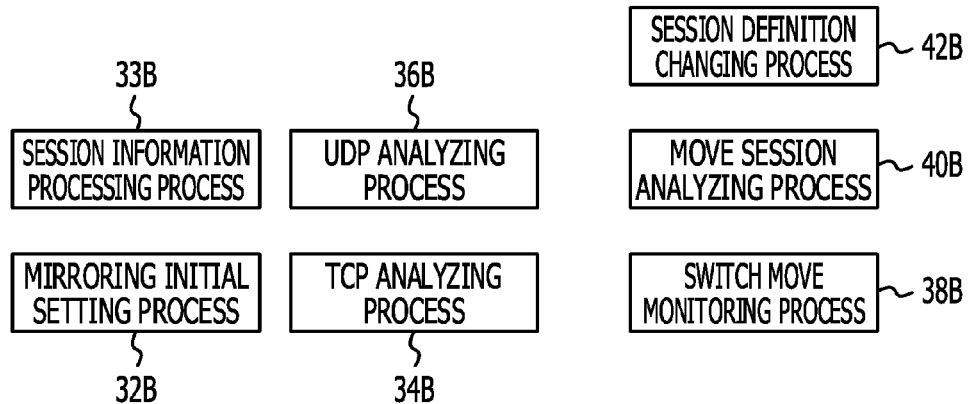
FIG. 3B is a diagram of an analysis process of the system analyzing device.

FIG. 3A depicts the analysis program of the system analyzing device 10. The analysis program includes a mirroring initial setting unit 32A, a session information processing unit 33A, a TCP analyzing unit 34A, a UDP analyzing unit 36A, a switch move monitoring unit 38A, a move session analyzing unit 40A, and a session definition changing unit 42A. FIG. 3B depicts an analysis process of the system analyzing device 10. The analysis process includes a mirroring initial setting process 32B, a session information processing process 33B, a TCP analyzing process 34B, and a UDP analyzing process 36B. The analysis process further includes a switch move monitoring process 38B, a move session analyzing process 40B, and a session definition changing process 42B. By executing the processes 32B, 33B, 34B, 36B, 38B, 40B, and 42B, the CPU 22 in the system analyzing device 10 operates as each of the units 32A, 33A, 34A, 36A, 38A, 40A, and 42A, respectively.

Figure 4:
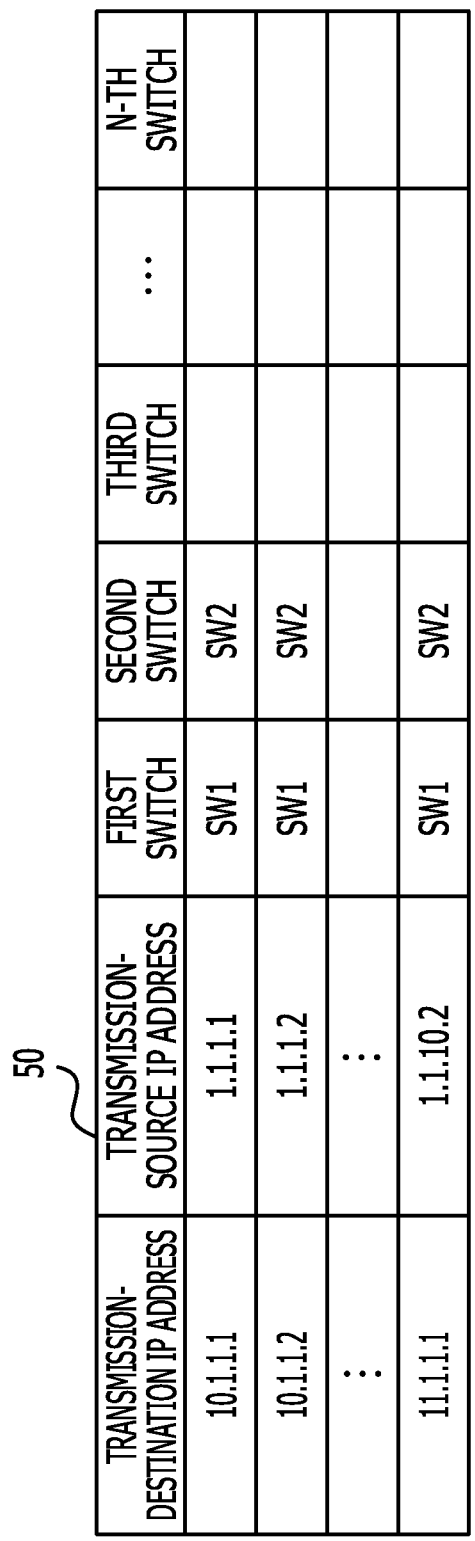
FIG. 4 is a diagram of a route switch registration table provided in a storage device of the system analyzing device.

FIG. 4 depicts a route switch registration table 50 provided in the storage device 24 of the system analyzing device 10. The route switch registration table 50 is provided with a field for storing a transmission-destination IP address, which is an Internet protocol (IP) address of a destination server to which a packet is to be transmitted, and a field for storing a transmission-source IP address, which is an IP address of a packet-transmission-source server. The route switch registration table 50 is provided with fields of "first" to "n-th" for storing identification information of first to n-th switches, respectively.

Here, "first" to "n-th" are described. When transferring a packet in communication between servers, a switch copies the transferred packet. The switch transmits the copy packet generated by copying to the system analyzing device 10. For example, as depicted in FIG. 1, the server C 14C and the server D 14D perform packet communication via the ports 16P12 and 16P13 in the first switch SW1 . With the port 16P13 taken as a copy target port, the first switch SW1 copies a packet in this communication. The first switch SW1 transmits the copy packet generated by copying to the system analyzing device 10 via the output port 16P14. The server A 14A and the server B 14B perform packet communication via the ports 16P21 and 16P22 in the second switch SW2. With the port 16P22 taken as a copy target port, the second switch SW2 copies a packet in this communication. The second switch SW2 transmits the copy packet generated by copying to the system analyzing device 10. In the present embodiment, the first switch SW1 and the second switch SW2 are each set by the system analyzing device 10 as follows. That is, at an initial stage, copy packets in communication among the servers are collected to concentrate on the first switch SW1 , and the collected copy packets are transmitted to the system analyzing device 10. Therefore, the second switch SW2 transmits the copy packets to the first switch SW1 via the port 16P24 of the second switch SW2 and the port 16P11 of the first switch SW1.

Here, switches from the first switch SW1 to a switch to which a server connected via a largest number of switches is directly connected in packet communication among servers are defined as "first" to "n-th" servers in sequence. Identification information (ID) of the "first" to "n-th" switches are stored in "first" to "n-th" fields. For example, in a communication where a packet is transmitted from the server C 14C to the server D 14D, the ID of the first switch SW1 , that is, SW1 , is stored only in the "first" field. In a communication where a packet is transmitted from the server A 14A to the server B 14B, the ID of the first switch SW1 , that is, SW1 , is stored in the "first" field, and the ID of the second switch SW2, that is, SW2, is stored in the "second" field. By an operator inputting via the input unit 21 in advance, data of the transmission-destination IP address and the transmission-source IP address is stored in each relevant field of the route switch registration table 50. The system analyzing device 10 and the first switch SW1 are connected to each other via one port 16P14, and the system analyzing device 10 and the second switch SW2 are connected to each other via one port 16P23. Therefore, the identification information (SW1 and SW2) of the switches stored in the "first" to "n-th" fields also correspond to identification numbers of the ports 16P14 and 16P23.

The route switch registration table 50 is an example of a "storage unit".

FIG. 5 depicts an initial setting table 52 provided in the storage device 24 of the system analyzing device 10. The initial setting table 52 is provided with fields for storing an L4 type, transmission-destination IP address, and transmission-destination port number. L4 is a fourth layer (a transport layer) in an OSI reference model. L4 includes the transmission control protocol (TCP), the user datagram protocol (UDP), the datagram congestion control protocol (DCCP), the stream control transmission protocol (SCTP), the resource reservation protocol (RSVP), and so on. In the present embodiment, however, TCP and UDP, which are generally used more often than the others, are exemplarily described. A port number is, in general, a number for specifying a program at the communication counterpart when a computer performs data communication. Therefore, a port number when a packet is transmitted from the server A 14A to the server D 14D is a number for specifying a program for communication at the server D 14D. By the operator inputting via the input unit 21 in advance, data pieces of the L4 type, transmission-destination IP address, transmission-destination port number are respectively stored in the relevant fields in the initial setting table 52.

Figure 6:
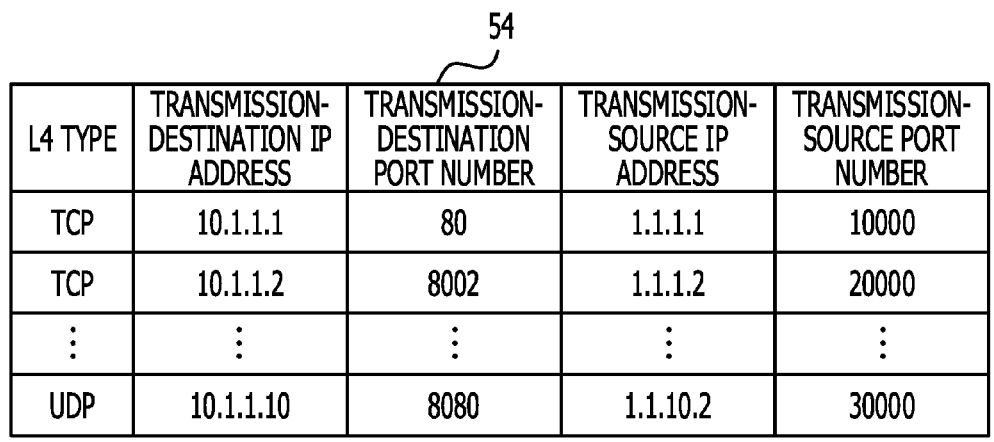
FIG. 6 is a diagram of a session definition table provided in each switch.

FIG. 6 depicts the session definition table 54 provided in each switch. The session definition table 54 is provided with fields where the L4 type, transmission-destination IP address, transmission-destination port number, transmission-source IP address, and transmission-source port number are stored. The transmission-port number is a number for specifying a program for communication at the transmission-source server. In the above example where a packet is transmitted from the server C 14C to the server D 14D, the transmission-source port number is a number for specifying a program for communication at the server C 14C.

With the L4 type, the transmission-destination IP address, transmission-destination port number, transmission-source IP address, and transmission-source port number, a communication actually being performed (one session) is identified. That is, when one server and another server communicate with each other, one session of communication between these servers is not uniquely identifiable only with the transmission-destination IP address of one server as a transmission destination and the transmission-source IP address of the other server as a transmission source. Each server includes a plurality of communication programs. Examples of the communication programs include a program for viewing a web page and a program for transmission and reception of electronic mails. While TCP is a protocol with relatively low communication speeds offering a guaranty of data communication, UDP is a protocol with relatively high communication speed not offering a guaranty of data communication. Therefore, even when the same communication program is used between the same servers, a communication session varies depending on the L4 type. As such, the communication session between servers is uniquely identified with the following pieces of information. That is, first information is information about data communication from which server to which server (the transmission-destination IP address and the transmission-source IP address). Second information is information about which communication program is to be used in these servers (the transmission-destination port number and the transmission-source port number). Third information is information about which protocol is to be used (L4 type). With these first to third information, it is recognized that a packet is communicated between the identified communication program of the identified server and the identified communication program of the other identified server by following the identified protocol. A communication distinguished with the first to third information is referred to as a session. A virtual transmission path for the communication identified with the first to third information is referred to as a connection.

FIG. 7 depicts a session information table 56 provided in the storage device 24 of the system analyzing device 10. The session information table 56 is provided with fields 56A to 56E for storing the L4 type, transmission-destination IP address, transmission-destination port number, transmission-source IP address, and transmission-source port number. The session information table 56 is further provided with fields 56F to 56K for storing data of a packet discard flag, input switch name, sequence number, message length and received message length, respectively. These pieces of data from the packet discard flag to the received message length will be described further below.

Figure 8:
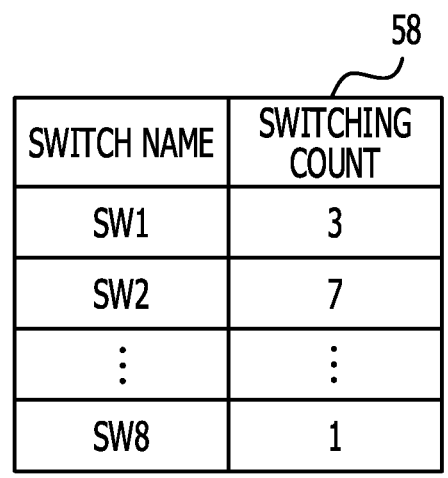
FIG. 8 is a diagram of a switching count table provided in the storage device of the system analyzing device.

FIG. 8 depicts a switching count table 58 provided in the storage device 24 of the system analyzing device 10. The switching count table 58 is a table for storing a switching count correspondingly to the switch name.

FIG. 9A, FIG. 9B, FIG. 9C, FIG. 9D, and FIG. 9E depict details of the packets. When data is communicated between servers, the data is divided into a plurality of pieces of divisional data, and the divisional data is transmitted as a packet. The details of the packet is defined as below by following any one protocol of TCP and UDP.

FIG. 9A depicts a packet 62A following TCP. The packet 62A following TCP includes an IP header 64, a TCP header 66A, and a TCP segment 68A including divisional data. FIG. 9B depicts a packet 62B following UDP. The packet 62B following UDP includes an IP header 64, a UDP header 66B, and a UDP datagram 68B. As will be described further below, in communication following UDP, a collection of a plurality of packets obtained by dividing data is referred to as a message. In each message, packets are transmitted sequentially from a head packet. The UDP datagram 68B in the head packet includes a message length 68B0 indicating a data length of all of the plurality of packets included in the message.

FIG. 9C depicts details of the IP header 64 that is common in the packet 62A following TCP and the packet 62B following UDP. The IP header 64 includes a version, header length, service type, datagram length, identifier, flag, fragment offset, survival time, protocol, and header checksum. The IP header 64 further includes the transmission-source IP address, transmission-destination IP address, option, and padding.

FIG. 9D depicts the TCP header 66A in the packet 62A following TCP. The TCP header 66A includes the transmission-source port number, transmission-destination port number, sequence number 66A1, acknowledge packet, header length, reservation bit, flag, window size, checksum, urgent pointer, option, and padding.

FIG. 9E depicts the UDP header 66B in the packet 62 following UDP. The UDP header 66B includes the transmission-source port number, transmission-destination port number, data length, and checksum.

Figure 10:
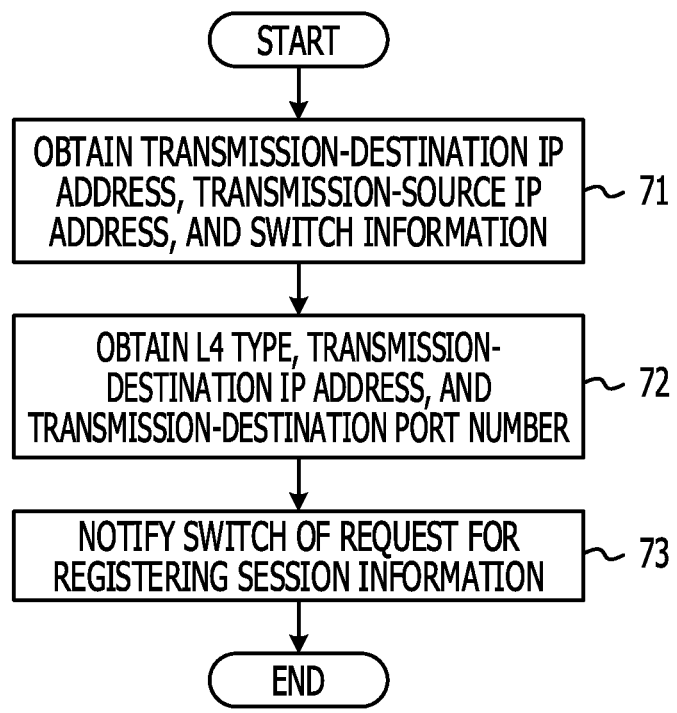
FIG. 10 is a flowchart of an example of a mirroring initial setting process by the system analyzing device to set a switch to perform mirroring.

Next, the operation of the present embodiment is described. FIG. 10 depicts an example of a mirroring initial setting process by the system analyzing device 10 to set a switch to perform mirroring. At step 71, the mirroring initial setting unit 32A obtains the following information in each communication between servers from the route switch registration table 50 of FIG. 4. That is, the mirroring initial setting unit 32A obtains the transmission-destination IP address, the transmission-source IP address, and the identification information of the first switch SW1 stored in the "first" field of the switches for transmission of the copy packet to the system analyzing device 10. At step 72, the mirroring initial setting unit 32A obtains the L4 type, the transmission-destination IP address, and the transmission-destination port number from the initial setting table 52 of FIG. 5. At step 73, the mirroring initial setting unit 32A notifies the first switch SW1 of a request for registering the session information of the L4 type, the transmission-destination IP address, and the transmission-destination port number. The first switch SW1 receiving the registration request stores, for each session, the L4 type, the transmission-destination IP address, and the transmission-destination port number in the session definition table 54 of FIG. 6. Meanwhile, as described above, the session is uniquely identified with the information notified in the process at step 73 and also the transmission-source port number defined. On the other hand, the transmission-source server has a plurality of communication programs for communication, as described above. Which communication program is used by the user for communication is not sure at a stage of mirroring initial setting. That is, the transmission-source port number is not determined at the stage of mirroring initial setting. Thus, at the stage of mirroring initial setting, the first switch SW1 sets any character (*) (wild card) is set in the field of the transmission-source port number. Then, when data communication is performed between servers, which communication program is used is determined. The TCP header 66A (FIG. 9D) or the UDP header 66B (FIG. 9E) of the packet includes the transmission-source port number corresponding to the transmission-destination port number. The first switch SW1 obtains the transmission-source port number in the TCP header 66A or the UDP header 66B, and stores the obtained transmission-source port number in the field of the transmission-source port number corresponding to the session in the session definition table 54.

The first switch SW1 transmits a copy packet in a session identified with the information for identifying each session stored in the session definition table 54 to the system analyzing device 10 via the output port 16P14. As described above, all copy packets in communication between servers are set at the initial stage to be transmitted to the first switch SW1. That is, at the initial stage, information corresponding to all sessions is stored in the session definition table 54 of the first switch SW1.

The other switches each have the session definition table 54. As will be described further below, when a registration request comes from the system analyzing device 10, the switch registers (stores) identification information of the session in the session definition table 54 of that switch. The switch having the identification information of the session stored in the session definition table 54 transmits the copy packet as follows. That is, the switch takes a port to which the system analyzing device 10 is connected as an output port. The switch then transmits the copy packet in the session identified with the identification information to the system analyzing device 10 via the output port.

On the other hand, when a notification of a request for deleting session information comes from the system analyzing device 10, the first switch SW1 deletes the identification information of the session from the session definition table 54 of the first switch SW1 . The switch having the identification information of the session deleted from the session definition table 54 stops transmission of the copy packet in the session to the system analyzing device 10.

Figure 16A:
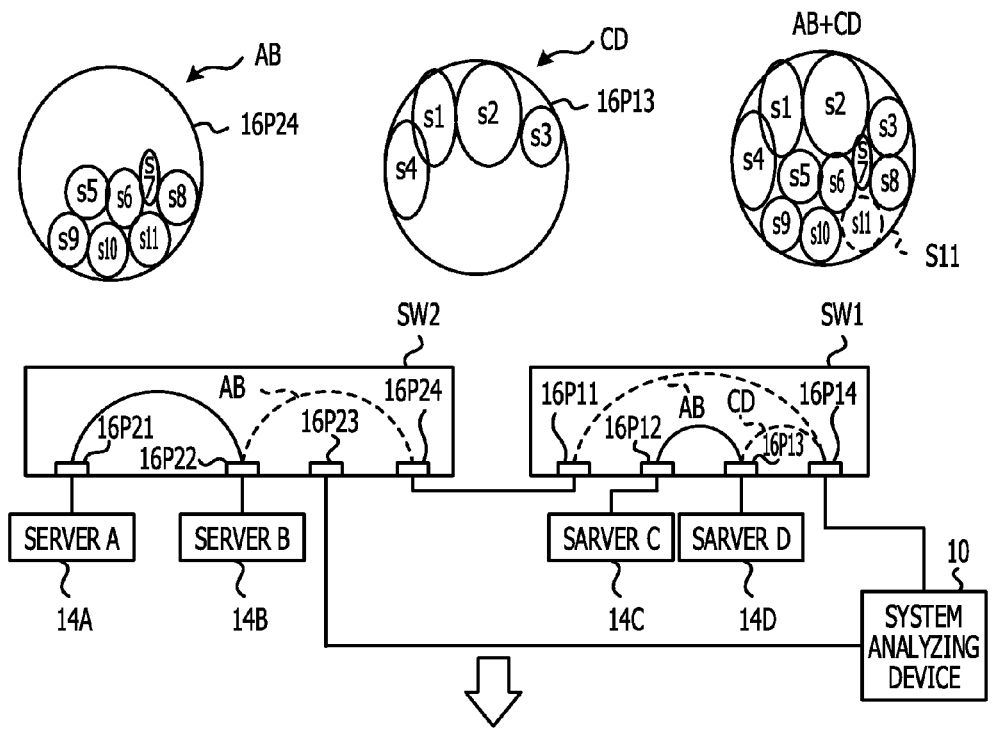
FIG. 16A is a diagram depicting the state in which a packet in a session is discarded at an output port.

Meanwhile, as described above, all copy packets in communication between servers are transmitted to the first switch SW1 . The first switch SW1 transmits the copy packets to the system analyzing device 10 via the output port 16P14. For example, as depicted in FIG. 16A, a packet in communication between the server A 14A and the server B 14B is copied at the target port 16P22. Each packet communication is identified for each session even in communication between the same servers. Therefore, the plurality of copy packets obtained by copying at the target port 16P22 may belong to sessions s5 to s11, as denoted by a reference character AB. The copy packets in these sessions s5 to s11 arrive at the output port 16P14 via the port 16P24 of the second switch SW2 and the port 16P11 of the first switch SW1 . The output port 16P14 temporarily stores these packets, and then transmits the temporarily-stored packets to the system analyzing device 10.

The packets in communication between the server C 14C and the server D 14D are copied at the target port 16P13. The plurality of copy packet obtained by copying at the target port 16P13 may belong to sessions s1 to s4, as denoted by a reference character CD. The copy packets in these sessions s1 to s4 obtained by copying arrive at the output port 16P14. The output port 16P14 temporarily stores these packets, and then transmits the temporarily-stored packets to the system analyzing device 10.

The data amount of the copy packets in the sessions s1 to s4 between the server A 14A and the server B 14B is assumed to be 50 Mbps. The data amount of the copy packets in the sessions s5 to s11 between the server C 14C and the server D 14D is assumed to be 60 Mbps. When these packets temporarily concentrate on the output port 16P14, the following occurs. As described above, the maximum value of the packet data amount temporarily storable in the output port 16P14 is 100 Mbps. Therefore, the situation is such that the copy packets concentrate on the output port 16P14 so as to exceed the maximum value of the data amount temporarily storable in the output port 16P14. It is assumed that a copy packet arriving at the output port 16P14 the latest among the sessions s1 to s11 is a copy packet of the session s11, and the copy packet amount of the session s11 is 10 Mbps. In this case, the copy packets in the sessions s1 to s10 are stored in the output port 16P14 and transmitted to the system analyzing device 10. However, the output port 16P14 is not able to temporarily store a copy packet any more. Therefore, the copy packet in the session s11 is not stored in the output port 16P14, and is thus not transmitted to the system analyzing device 10. That is, the copy packet in the session s11 is discarded at the output port 16P14. If this situation continues, the system analyzing device 10 may not be able to accurately analyze the state of packet communication corresponding to the copy packet discarded in the system. In the present embodiment, analysis of the state of the system is allowed to continue by the following process.

Figure 11:
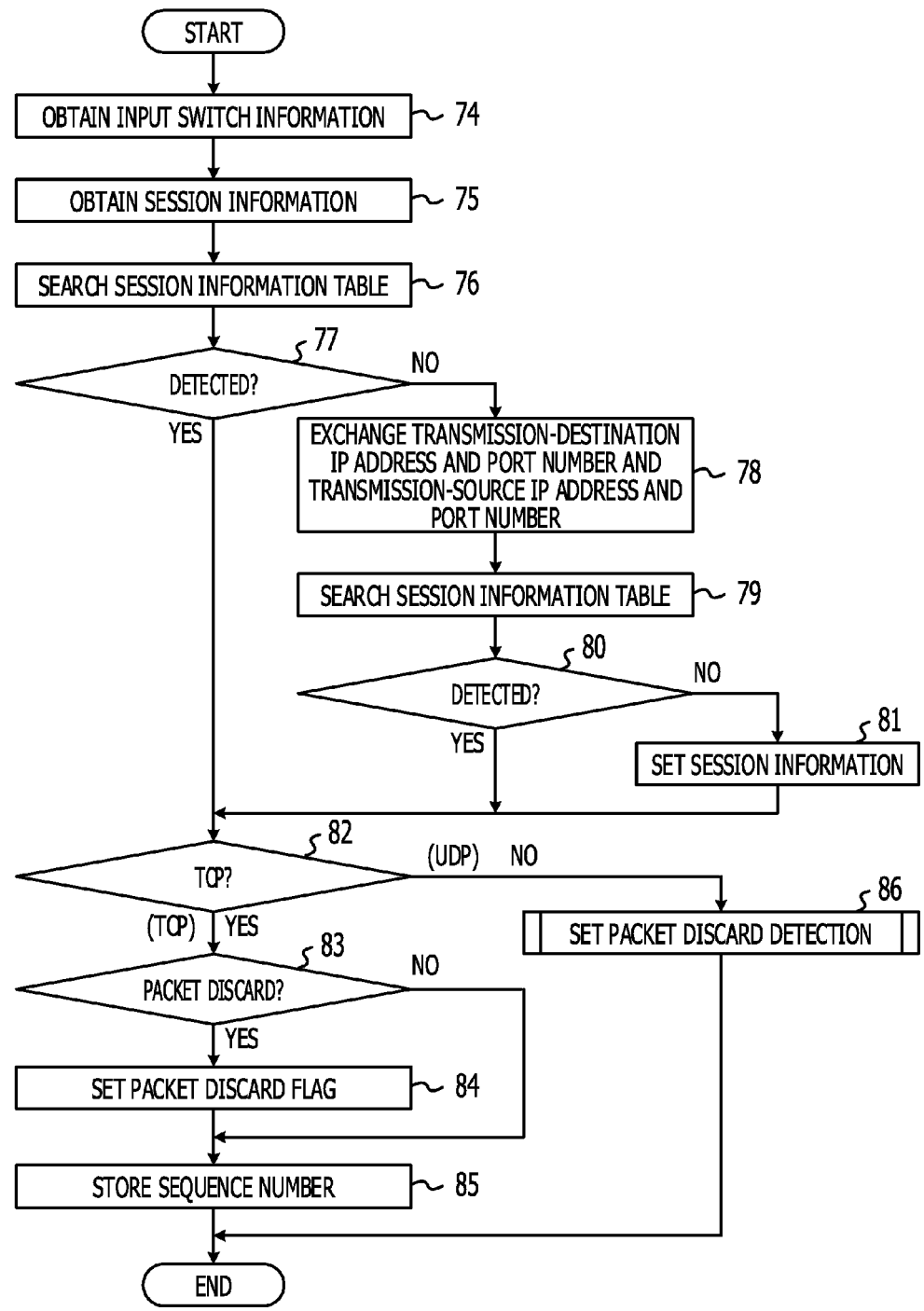
FIG. 11 is a flowchart of an example of a packet discard detection process.

FIG. 11 depicts an example of a packet discard detection process. The packet discard detection process starts every time a copy packet is received. At step 74, the session information processing unit 33A obtains information about an input switch transmitting the received copy packet. At an initial stage, as described above, all copy packets are transmitted by the first switch SW1 . Therefore, the session information processing unit 33A obtains identification information of the first switch SW1 . The session information processing unit 33A obtains the information about the first switch SW by, for example, determining from which portion the NIC 30 has been received.

The session information processing unit 33A obtains session information at step 75. That is, first, as depicted in FIG. 9C, the session information processing unit 33A obtains the transmission-source IP address and the transmission-destination IP address from the IP header 64. Next, as depicted in FIG. 9A and FIG. 9B, when the TCP header 66A is present in the packet, the session information processing unit 33A specifies TCP as the L4 type. When the UDP header 66B is present in the packet, the session information processing unit 33A specifies UDP as the L4 type. When the TCP header 66A is present in the packet, as depicted in FIG. 9D, the session information processing unit 33A obtains the transmission-source and transmission-destination port numbers in the TCP header 66A. When the UDP header 66B is present in the packet, as depicted in FIG. 9E, the session information processing unit 33A obtains the transmission-source and transmission-destination port numbers in the UDP header 66B.

The session information processing unit 33A searches the session information table 56 (FIG. 7) at step 76. The session information processing unit 33A then determines at step 77 whether the session information obtained at step 75 is detected in the session information table 56. When the session information obtained at step 75 is detected in the session information table 56, the packet discard detection process proceeds to a process at step 82.

Meanwhile, in communication between servers, a packet is transmitted not only from one server to another server but also from the other server to the one server. However, as described above, the session information table 56 has only the session information in packet transmission in either one of directions between servers is registered as a session for communication between servers. Thus, when the session information obtained at step 75 is not detected in the session information table 56, the session information processing unit 33A exchanges the transmission-destination and transmission-source IP addresses and port numbers at step 78. At step 79, the session information processing unit 33A searches the session information table 56. The session information processing unit 33A then determines at step 80 whether the session information obtained at step 75 is detected in the session information table 56.

The determination result at step 80 is negative because the result of a new session performed. That is, for example, the determination result at step 80 is negative when communication is newly performed between servers not in communication so far or when a completely new server is added to the system. Thus, at step 81, the session information processing unit 33A stores the input switch information obtained at step 74 and the session information obtained at step 75 in the fields 56G and 56A to 56E in the session information table 56. The packet discard detection process then proceeds to step 82.

The TCP analyzing unit 34A determines at step 82 whether the TCP header 66A is present in the copy packet received this time, thereby determining whether the copy packet follows TCP. When the copy packet received this time follows TCP, the TCP analyzing unit 34A determines at step 83 whether the copy packet is discarded.

Here, the principle of detecting discard of the copy packet following TCP is described. In TCP, when data is transmitted, the data is divided into a plurality of pieces of divisional data. These pieces of divisional data are each included in the TCP segment of the packet 62A depicted in FIG. 9A, and sequentially transmitted as a plurality of packets for the data. In TCP, the sequence number 66A1 for identifying the plurality of packets in a transmission order is added to the TCP header 66A in each packet 62A. As will be described further below, every time a copy packet following TCP is received, the TCP analyzing unit 34A obtains the above sequence number 66A1 at step 85. Then, the TCP analyzing unit 34A overwrites the sequence number in the session information table 56 (FIG. 7) with the obtained sequence number 66A1 to store it. For this reason, the TCP analyzing unit 34A obtains the sequence number 66A1 from the copy packet received this time. When the sequence number 66A1 is successive to the sequence number in the session information table 56 (FIG. 7), it is understood that the copy packet in this session has been successively received. That is, it is understood that no packet discard occurs.

However, for example, consider the case in which the sequence number in the session information table 56 (FIG. 7) is 4 and the sequence number 66A1 obtained from the copy packet received this time is 10. In this case, it is understood that copy packets identified with sequence numbers 5 to 9 have been discarded.

Thus, the TCP analyzing unit 34A determines at step 83 whether the sequence number obtained from the copy packet received this time is successive to the sequence number in the session information table 56. With this, it is determined whether another copy packet which belongs to a session to which the copy packet received this time belong has been discarded.

If the copy packet received this time has been discarded, the TCP analyzing unit 34A sets, at step 84, 1 in the packet discard flag 56F in the session information table 56 corresponding to the session of the copy packet received this time. Thus, if it is found later that 1 is set in the session information table 56, it is understood that the copy packet has been discarded in this session.

After the process at step 84 and when the determination result at step 83 is negative, the packet discard detection process proceeds to step 85. At step 85, the TCP analyzing unit 34A overwrites the sequence number in the session information table 56 with the sequence number obtained from the packet received this time for storage. With the process at step 85 performed, the packet discard detection process ends.

On the other hand, when it is determined at step 82 that the copy packet received this time does not follow TCP, the UDP analyzing unit 36A performs a discard detection and setting process for a packet following UDP at step 86. With the process at step 86 performed, the packet discard detection process ends.

Step 83 and step 86 of FIG. 11 (steps 87 to 94 of FIG. 12) are an example of details of "detection".

FIG. 12 depicts an example of the packet discard detection and setting process for a packet following UDP. First, how the packet following UDP is transmitted is described. FIG. 13A depicts the state in which the packet following UDP is transmitted. As depicted in FIG. 13A, a chunk having a plurality of packets formed by dividing one piece of data into a plurality of pieces of data is referred to as a message. In a session in a same connection C, a plurality of messages M1 and M2 are successively transmitted. In the example depicted in FIG. 13A, in the first message M1 and the second message M2, one data is divided into three, and three packets are transmitted. The UDP datagram 68B (FIG. 9B) of a head packet of one message includes data of a full message length of all packets included in the message. Therefore, it is recognized whether the packet is a head packet of one message depending on the presence or absence of the identification information of the head packet.

FIG. 13B depicts the state in which the second copy packet is discarded in the copy packets of the first message M1 and the head copy packet of the next second message M2 is detected. In the packets of the first message M1, the head copy packet may be discarded.

At step 87 of FIG. 12, the UDP analyzing unit 36A determines, based on the presence or absence of head packet identification information, whether the copy packet received this time is a head copy packet.

When the copy packet received this time is a head copy packet, the UDP analyzing unit 36A reads the message length at step 88. The UDP analyzing unit 36A stores (sets) the read message length in the field 56J in the session definition table 56 of FIG. 7 for storing a message length corresponding to the session of the copy packet.

The UDP analyzing unit 36A determines at step 89 whether the received message length is 0. The process at step 89 will be described further below.

On the other hand, when the process result at step 87 is negative, that is, when the copy packet received this time is not a head packet, the UDP analyzing unit 36A determines at step 92 whether the message length has been set, which will be described further below.

When the determination result at step 92 is positive, the packet discard detection setting process proceeds to step 90.

Meanwhile, the UDP header 66B of the packet following UDP includes the data length of the packet, as depicted in FIG. 9E. When the data lengths of the respective packets are added up for one message, the addition value is equal to the message length. Thus, at step 90, the UDP analyzing unit 36A reads the data length of the copy packet received this time. The UDP analyzing unit 36A then adds the read data length to the addition value of the data length (received message length) of each of the copy packets received so far. At step 91, the UDP analyzing unit 36A determines whether the received message length is equal to the message length. When the determination result at step 91 is positive, the UDP analyzing unit 36A determines that all packets in one message have been received. The UDP analyzing unit 36A then clears the received message length to 0 at step 93.

The process at step 89 is now described. The process at step 89 is performed when it is determined at step 87 that the packet is a head copy packet and before the process at step 90 is performed. Therefore, the received message length is supposed to be 0. However, as depicted in FIG. 13B, consider the case in which a copy packet in the middle of one message, for example, a second copy packet, has been discarded. In this case, the last copy packet of one message is received and the data length of this packet is added to the received message length to obtain an addition value, which is not equal to the message length. Therefore, the determination result at step 91 is negative, and the received message length is not 0. In this state, when a head copy packet of the next message is received, the received message length is not 0 at step 89. That is, when the determination result at step 89 is negative, it is found that a copy packet in the middle of one message has been discarded. Thus, at step 94, the UDP analyzing unit 36A sets 1 in the field 56F (FIG. 7) of the packet discard flag.

Next, the process at step 92 is described. If the head copy packet of the message has been received, the message length is set at step 88. However, if the head copy packet is discarded and, for example, and the second copy packet is received, the determination result at step 87 is negative, and the process at step 88 is not performed. From this, the following is understood. First, when it is determined that the packet is not a head copy packet, it is originally supposed that the head copy packet has been received, and therefore the message length is set. However, even when it is determined that the packet is not a head copy packet, the message length is not received, that is, the determination result at step 92 is negative, because the head copy packet has been discarded and thereby the message length is not set. That is, when the determination result at step 92 is negative, it is found that the head copy packet has been discarded. Thus, when the determination result at step 92 is negative, the UDP analyzing unit 36A sets 1 in the field 56F (FIG. 7) of the packet discard flag at step 94.

FIG. 14 depicts an example of a first periodic process performed at every predetermined time (for example, one minute). At step 122, the move session analyzing unit 40A searches for a session where 1 is set in the packet discard flag 56F in the session information table 56 (FIG. 7). At step 124, the move session analyzing unit 40A determines whether a session where 1 is set in the field 56F of the packet discard flag is present. When a session where 1 is set in the field 56F of the packet discard flag is not present, this periodic process ends. When a session where 1 is set in the field 56F of the packet discard flag is present, the move session analyzing unit 40A obtains the following data from the session information table 56 of FIG. 7 at step 126. That is, the move session analyzing unit 40A obtains the transmission-destination IP address and the transmission-source IP address and the current input switch name in the session where 1 is set in the field 56F of the packet discard flag.

At step 128, the move session analyzing unit 40A refers to the route switch registration table 50 (FIG. 4) to search whether the identification information of another switch is registered in addition to the identification information of the current input switch. If the identification information of another switch is registered, the move session analyzing unit 40A collects the identification information of a switch registered next to the current input switch at step 130. In the example depicted in FIG. 16A, the session s11 where a packet has been discarded is based on communication between the server A 14A and the server B 14B. In this case, the identification information of the first switch SW1 is registered in the field 56G (FIG. 7) of the input switch name. With reference to the route switch registration table 50 (FIG. 4), the identification information of the second switch SW2 is registered as a switch registered other than the current input switch. Therefore, in the example depicted in FIG. 16A, the determination result at step 128 is positive. Then in the process at step 130, the move session analyzing unit 40A obtains the identification information of the second switch SW2.

At step 132, the session definition changing unit 42A requests the current switch (the first switch SW1) to delete the registered session information. With this, the first switch SW1 deletes the requested session information from the session definition table 54. Thus, thereafter, the first switch SW1 does not transmit the copy packet in the session s11 to the system analyzing device 10. At step 134, the session definition changing unit 42A notifies the second switch SW2 identified by the identification information obtained at step 130 of an additional request for new session information. With this, the second switch SW2 registers the requested session information in the session definition table 54. Thus, thereafter, the second switch SW2 transmits the copy packet in the session s11 to the system analyzing device 10 via the port 16P23 connected to the system analyzing device 10.

Figure 16B:
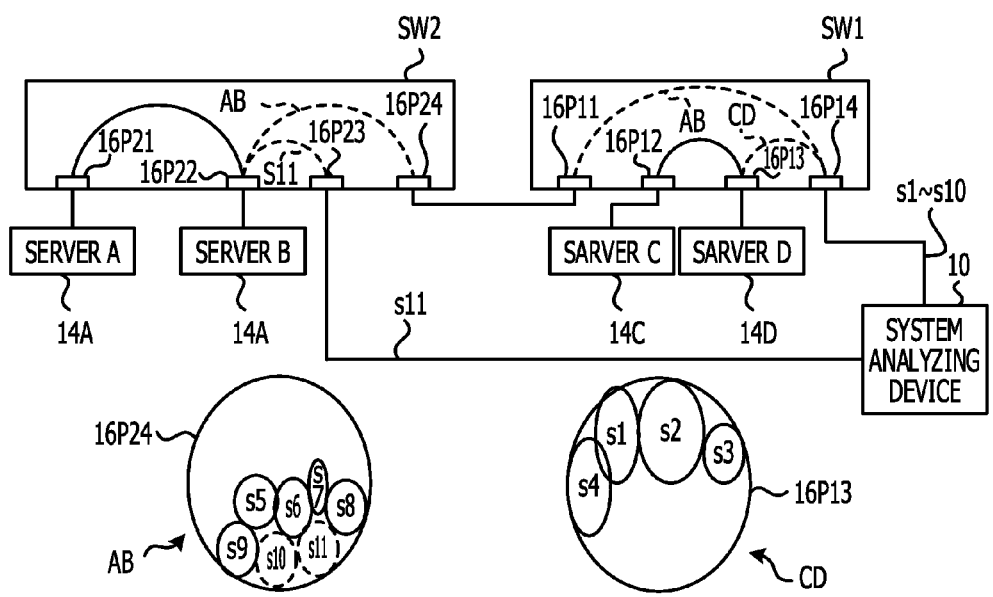
FIG. 16B is a diagram depicting the state in which a packet belonging to the session in which the packet has been discarded is switched from a switch to another switch and then transmitted to the system analyzing device.

With this, first, as depicted in FIG. 16B, copy packets (which belong to the session s5 to s10) in communication between the server A 14A and the server B 14B are transmitted as before. That is, these copy packets are transmitted via the port 16P24 of the second switch SW2, the port 16P11 of the first switch SW1, and the output port 16P14 to the system analyzing device 10. The copy packets (which belong to the session s1 to s4) in communication between the server C 14C and the server D 14D are also transmitted as before to the system analyzing device 10 via the output port 16P14. As such, the copy packets which belong to the sessions s1 to s10 where a packet is not discarded are transmitted to the system analyzing device 10 via the output port 16P14.

However, the copy packets which belong to the session s11 where a packet has been discarded is transmitted as follows. That is, the copy packet is transmitted to the system analyzing device 10 via the port 16P23 of the second switch SW2, which is different from the first switch SW1 before packet discard is detected, the port 16P23 being connected to the system analyzing device 10.

The process at step 134 is an example of control by the transfer device.

At step 136, the session definition changing unit 42A updates the switching count table 58 (FIG. 8) for recording a switching count. At step 138, the session definition changing unit 42A changes the information in the field 56G of the input switch name in the session information table 56 (FIG. 7) to the identification information about a move-destination switch.

As described above, the packet in the session s11 is transmitted to the system analyzing device 10 via the port 16P23 of the second switch SW2. Then, at step 140, the move session analyzing unit 40A sets 0 in the field 56F of the packet discard flag.

As described above, even though 1 is set in the field 56F of the packet discard flag and the route switch registration table 50 (FIG. 4) is searched, another switch may not be found (when the determination result at step 128 is negative). In the example depicted in FIG. 16A, for example, it is detected that the packets in the sessions s1 to s4 have been discarded. In this case, the move session analyzing unit 40A sets 0 in the field 56F of the packet discard flag at step 140.

Figure 15:
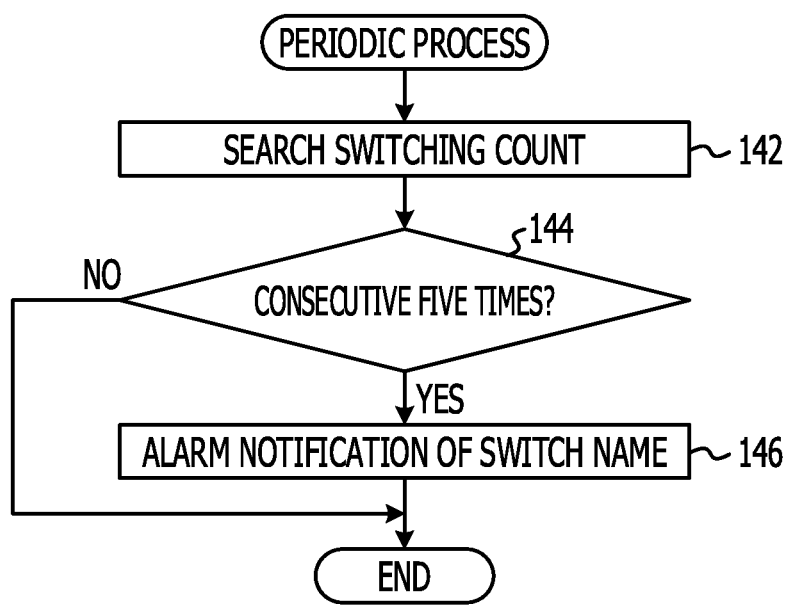
FIG. 15 is a flowchart of an example of a second periodic process.

FIG. 15 depicts an example of a second periodic process performed at every predetermined time (for example, one hour). At step 142, the switch move monitoring unit 38A refers to the switching count table 58 (FIG. 8). At step 144, the switch move monitoring unit 38A determines whether switching has been made successively five times. If no switch has been switched successively five times, the second periodic process ends.

If there is a switch that has been switched successively five times, the switch move monitoring unit 38A determines that the traffic amount (the amount of passage of copy packets) of the mirroring target session exceeds a limit value of the mirroring output port. Then, at step 146, the switch move monitoring unit 38A displays the switch name of the switching switch on the display unit 23, thereby notifying a maintenance person with an alarm. As described above, the system analyzing device 10 and the first switch SW1 are connected to each other via one port 16P14, and the system analyzing device 10 and the second switch SW2 are connected to each other via one port 16P23. Therefore, the displayed switch names correspond to the information regarding the ports 16P14 and 16P23. The switch name is an example of "information regarding the transfer device".

Next, effects of the present embodiment are described.

A first effect is described. In the present embodiment, the packet which belongs to the session s11 where a packet has been discarded is transmitted to the system analyzing device 10 via the second switch SW2 different from the first switch SW1 before packet discard is detected. Therefore, in the present embodiment, even if a packet is discarded, a packet in the session associated with the discarded packet is transmitted to the system analyzing device 10. Therefore, the present embodiment has the first effect of keeping analysis of the packet which belongs to the session where a packet has been discarded.

A second effect is described. When a copy packet is discarded, copy packets in all sessions passing through the target port may be transmitted to the system analyzing device 10 via another switch. However, another switch may already have transmitted a copy packet in communication between other servers to the system analyzing device 10. Therefore, in this case, a copy packet may be discarded in that other switch. However, in the present embodiment, when a copy packet is discarded, only a copy packet in a session to which the discarded copy packet belongs is transmitted to the system analysis device 10 via another switch. Therefore, the present embodiment has the second effect of further decreasing the possibility of occurrence of copy-packet discard at another switch.

A third effect is described. In the present embodiment, the identification information of the switch where switching has been made is stored. If a switch where switching has been made successively a predetermined times is found, the switch name of the found switch is displayed. Therefore, the present embodiment has the third effect of notifying the maintenance person as such.

A fourth effect is described. In the present embodiment, as described above, copy-packet discard is detected every time a copy packet is received. Therefore, copy-packet discard is detected more quickly than the case in which the data amount of the copy packets in communication among a plurality of servers transmitted to the same output port is measured and whether the total data amount exceeds a data amount temporarily storable in the output port is determined. That is, the present embodiment has the fourth effect of detecting copy-packet discard more quickly.

A fifth effect is described. In the present embodiment, discard of a packet following UDP is detected based on the message length in the packet following the UDP and the packet amount of each packet included in the message. Therefore, the present embodiment has the fifth embodiment of also detecting discard of a packet following UDP.

Next, modification examples of the present embodiment are described.

A modification example 1-1 is described. In the above example, the following case is assumed. That is, the server A 14A (the server B 14B) corresponding to the discarded packet is coupled via the second switch SW2 different from the first switch SW1 having the output port 16P14. The first switch SW1 and the second switch SW2 are directly connected to each other. The system has four servers. The embodiment is not restricted to the above example.

Figure 17A:
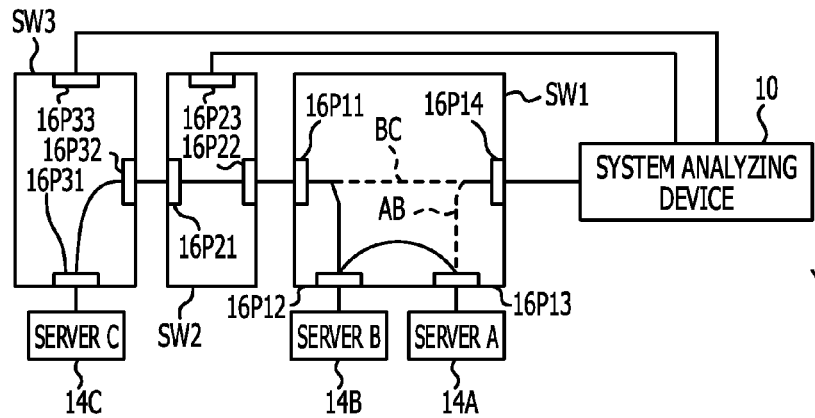
FIG. 17A to FIG. 17C are block diagrams of a modification example 1-1.
Figure 17B:
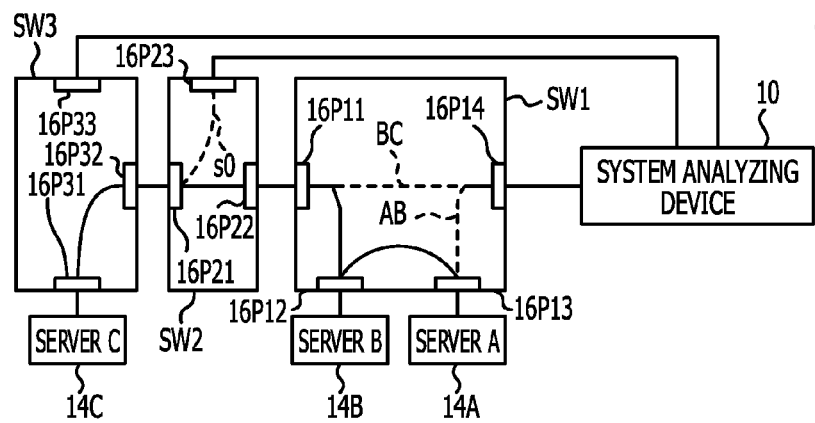
Figure 17C:
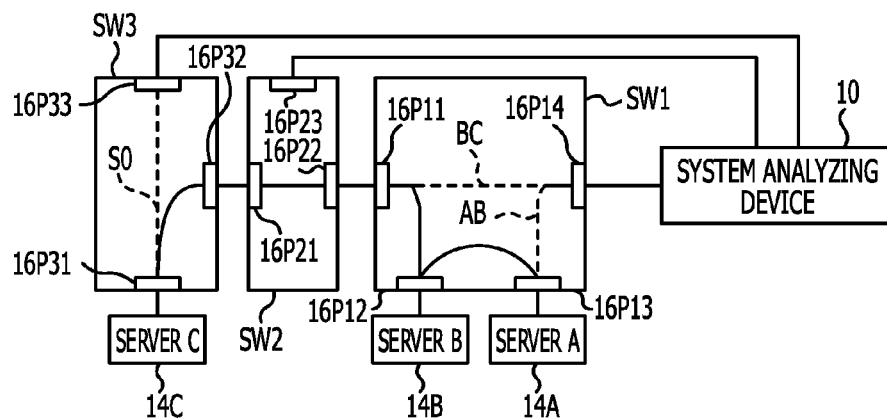

As depicted in FIG. 17A, a system has three servers A 14A, B 14B and C 14C. The server A 14A and the server B 14B are communicated with each other via a first switch SW1. The server B 14B and the server C 14C are communicated with each other via three switches, that is, a first switch SW1, a second switch SW2, and a third switch SW3. When it is detected that a copy packet in communication between the server B 14B and the server C 14C has been discarded, a packet is transmitted as follows. That is, a packet in a session s0 to which the discarded copy packet belongs is transmitted to the system analyzing device 10 via the second switch SW2 as depicted in FIG. 17B or via the third switch SW3 as depicted in FIG. 17C.

A modification example 1-2 is described. In the above example, as depicted in FIG. 1 and FIG. 16A, the first switch SW1 and the second switch SW2 are directly connected to the system analyzing device 10. When packet discard is detected, another packet in the session to which the discarded packet belongs is transmitted from the first switch SW1 via the second switch SW2 to the system analyzing device 10. The embodiment is not restricted to the above example.

Figure 18A:
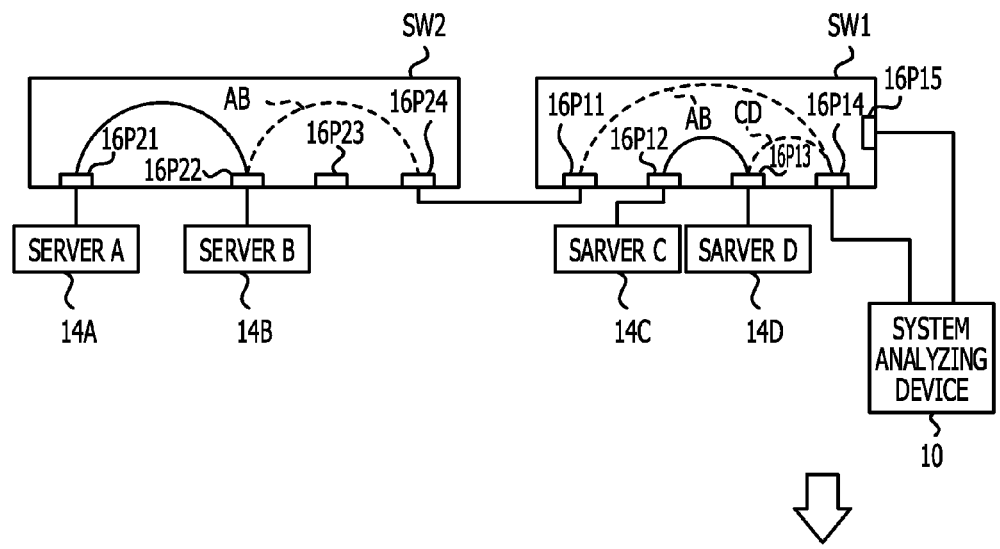
FIG. 18A and FIG. 18B are block diagrams of a modification example 1-2.
Figure 18B:
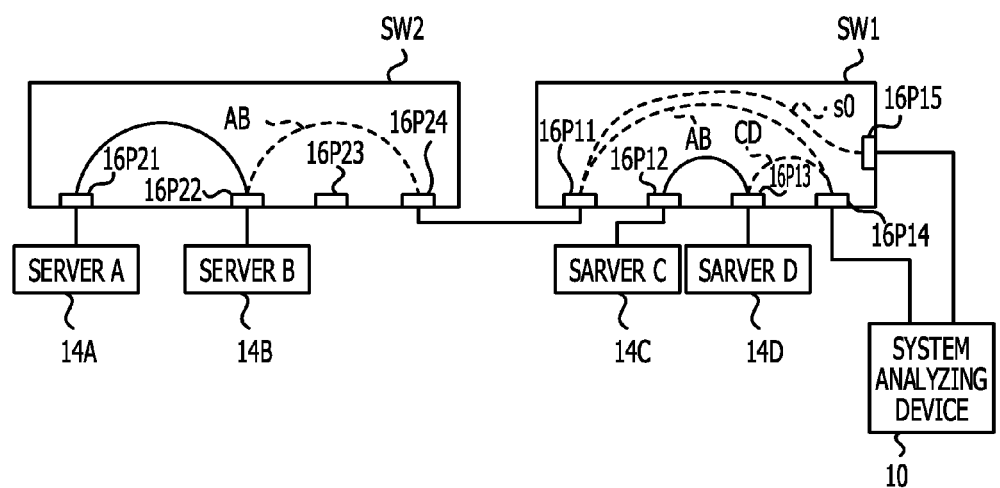

As depicted in FIG. 18A, the second switch SW2 is not directly connected to the system analyzing device 10. The system analyzing device 10 is connected to the first switch SW1 via two different ports 16P14 and 16P15. As described above, when a packet is discarded at the port 16P14, only the packet in the session s0 is allowed to be transmitted from the port 16P15 to the system analyzing device 10, as depicted in FIG. 18B.

Figure 19A:
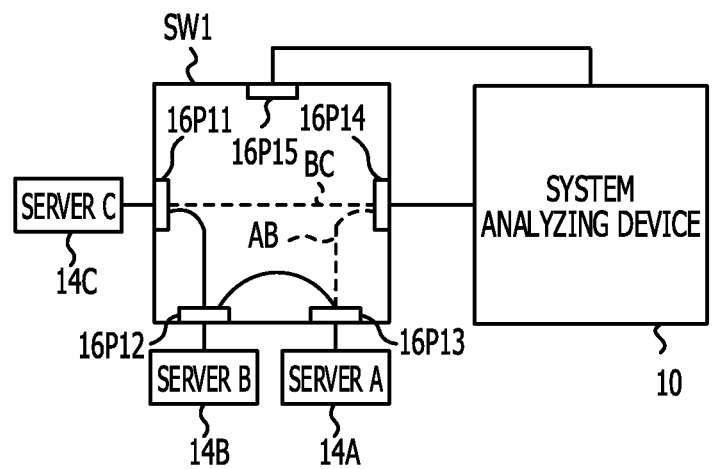
FIG. 19A and FIG. 19B are block diagrams of a modification example 1-3-1.
Figure 19B:
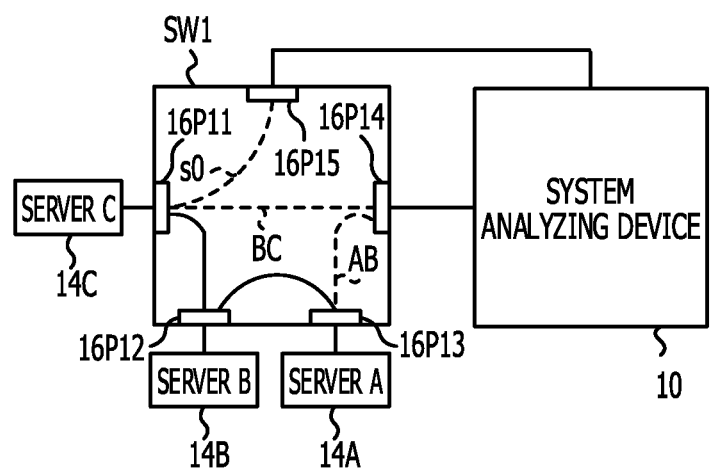
Figure 20A:
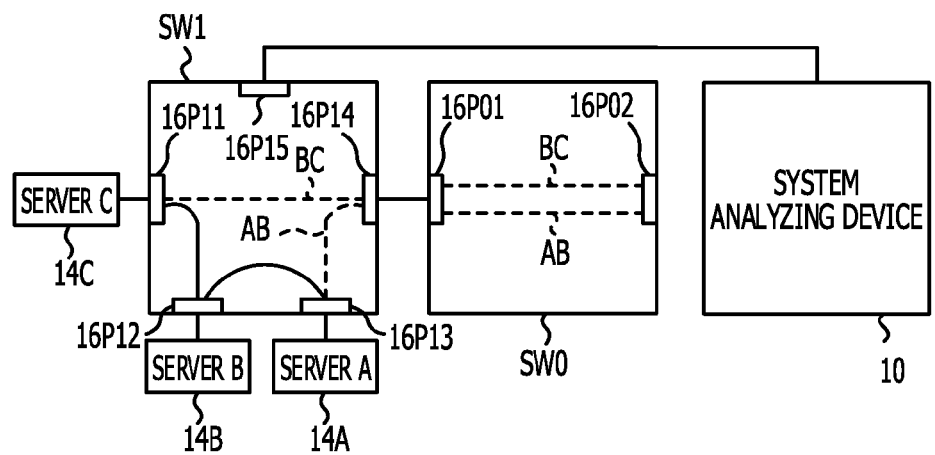
FIG. 20A and FIG. 20B are block diagrams of a modification example 1-3-2.
Figure 20B:
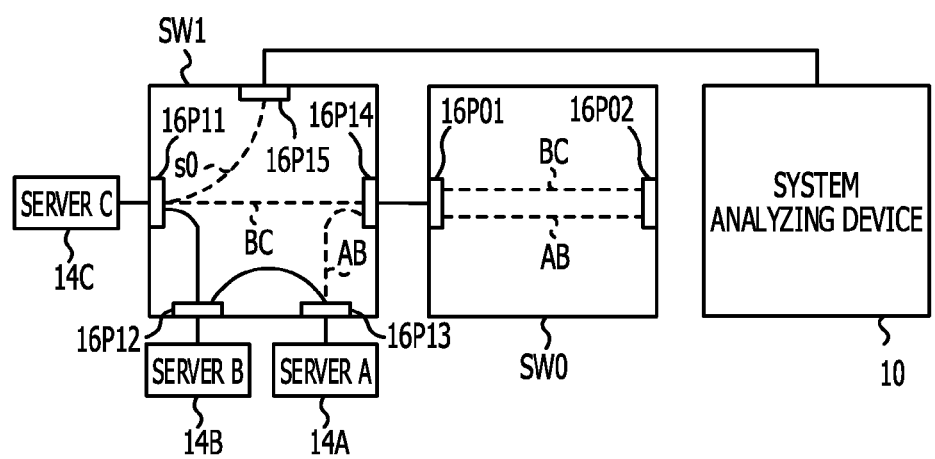

A modification example 1-3 is described. In the above example, a plurality of (two) switches are connected to the system analyzing device 10, that is, the first switch SW1 and the second switch SW2. The embodiment is not restricted to the above example. That is, as depicted in FIG. 19A, the case may be thought in which the first switch SW1 is the only switch connected to the system analyzing device 10. In this case, the system analyzing device 10 is connected to the first switch SW1 via two different ports 16P14 and 16P15. As described above, when a packet is discarded at the port 16P14, as depicted in FIG. 19B, only the packet in the session s0 to which the discarded packet belongs is allowed to be transmitted from the port 16P15 to the system analyzing device 10. Furthermore, as depicted in FIG. 20A and FIG. 20B, another switch SW0 may be connected between the first switch SW1 and the system analyzing device 10 depicted in FIGS. 19A and 19B.

Furthermore, the system may include two servers and one switch connected to a system analyzing device via a plurality of ports. That is, packet communication with a plurality of sessions is performed between two servers, and copy packets corresponding thereto may be concentrated on the output port so as to exceed the packet amount temporarily storable in the output port. To address this, a copy packet in a session corresponding to the discarded copy packet is transmitted to the system analyzing device 10 from a port other than the output port, the port to which the system analyzing device 10 is connected.

A modification example 1-4 is described. In the example depicted in FIG. 1, the server C 14C and the server D 14D communicate with each other via the first switch SW1, and the server A 14A and the server B 14B communicate with each other via the second switch SW2. This is not meant to be restrictive. That is, as depicted in FIG. 21A, the server A 14A and the server D 14D may communicate with each other and the server C 14C and the server B 14B may communicate with each other, both via the first switch SW1 and the second switch SW2. As described above, when a packet is discarded at the port 16P25, the packet in the session s0 to which the discarded packet belongs is allowed to be transmitted to the system analyzing device 10 via the port 16P26.

Secondly, in the above example, discard of a packet following TCP is determined based on the successiveness of sequence numbers. However, the embodiment is not restricted to the above example. That is, the identification information of the received packet is stored every time a packet is received. Packet discard may be detected when a packet corresponding to a response from a packet-destination server corresponding to packet transmission is received, based on the presence or absence of an original packet corresponding to the response.

Thirdly, in the above example, the head packet includes the identification information of the head packet indicating a feature thereof, that is, that the packet is a heat packet. The embodiment is not restricted to the above example.

Figure 22:
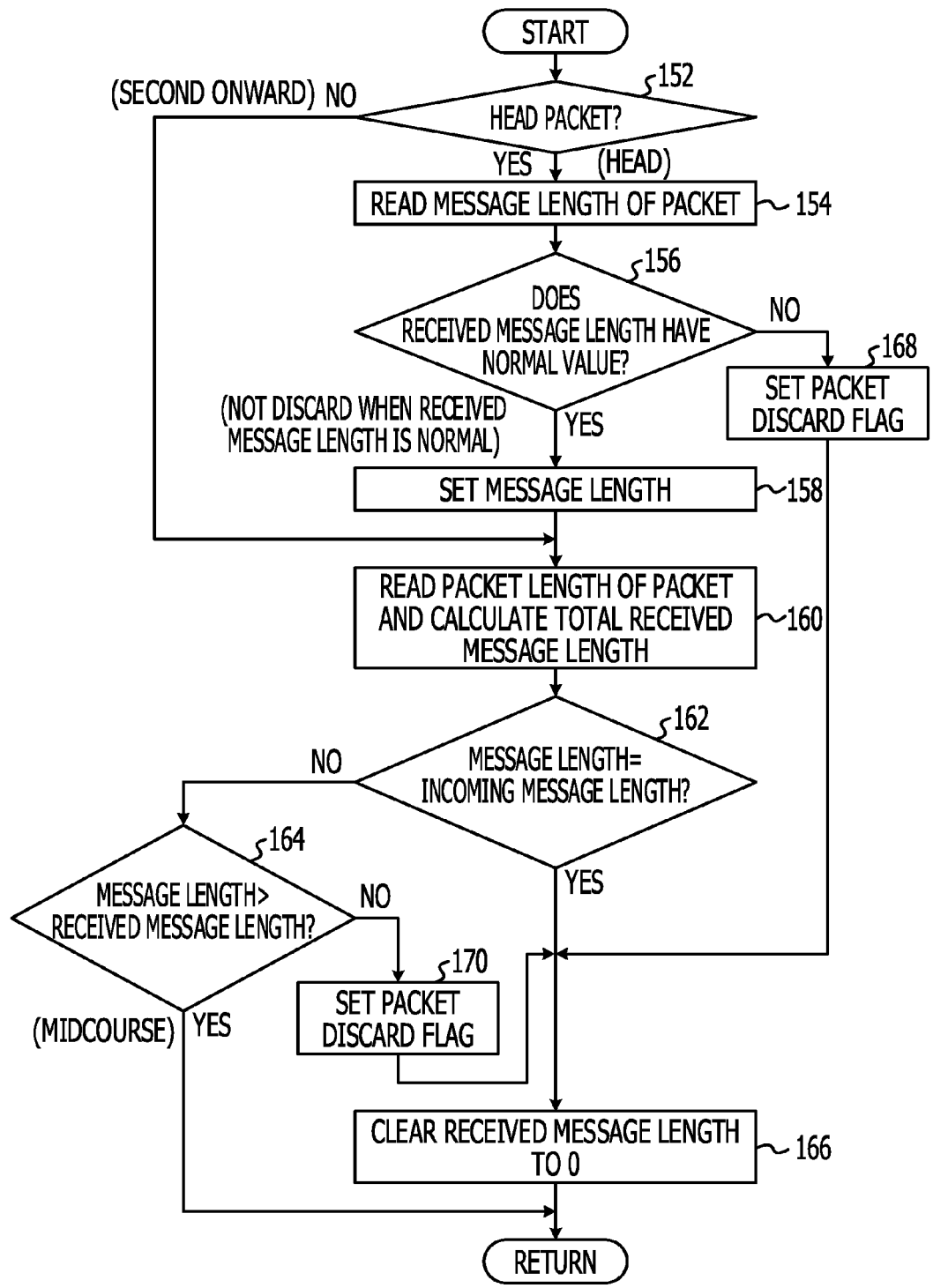
FIG. 22 is a flowchart of an example of a discard detection and setting process for a packet following UDP in a modification example 2.
Figure 24A:
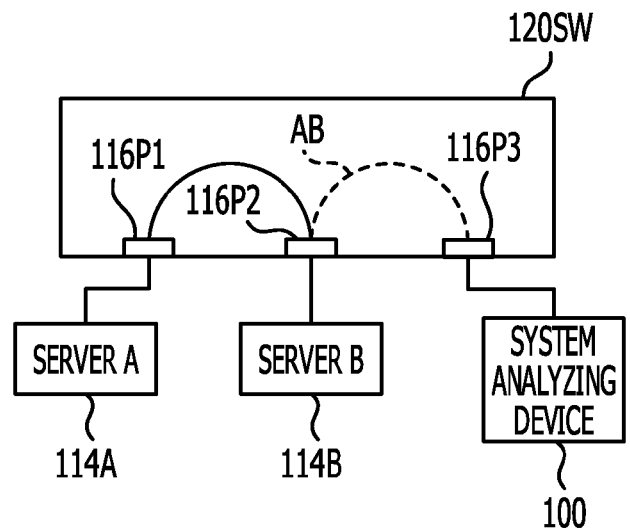
FIG. 24A is a diagram depicting the state in which communication between servers via a switch is mirrored.
Figure 24B:
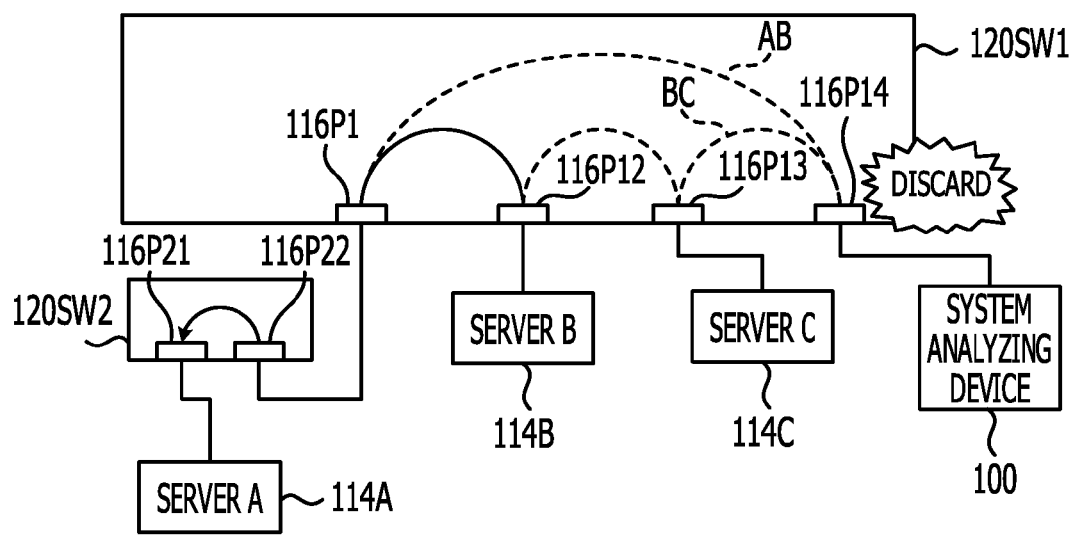
FIG. 24B is a diagram depicting the state of mirroring of communication among three servers via two switches.

FIG. 22 depicts an example of a discard detection and setting process for a packet following UDP in a modification example 2. A message length and an received message length are similar to those in the above example.

In the modification example 2, whether the copy packet received this time is a head copy packet is determined not based on the presence or absence of the identification information. When the packet received this time is a head copy packet, the process of adding the received message length, which will be described further below, is not performed. That is, when the packet received this time is a head copy packet, the received message length is 0.

Thus, the UDP analyzing unit 36A determines at step 152 whether the received message length corresponding to the session to which the copy packet received this time belongs is 0, thereby determining whether the packet received this time is a head copy packet.

When the packet received this time is not a head copy packet, that is, if the second copy packet onward has been received, the packet discard detection and setting process proceeds to a process at step 160. When the packet received this time is a head copy packet, the UDP analyzing unit 36A reads the message length from the copy packet at step 154. The UDP analyzing unit 36A then determines at step 156 whether the message length is normal. For example, as depicted in FIG. 23A, consider the case in which, with the head copy packet being discarded, the second copy packet is received. In this case, the process of adding the received message length, which will be described further below, is not performed. Therefore, since the received message length is 0, the determination at step 152 is positive. Then, after step 154, it is determined at step 156 whether the message length is normal, and therefore the message length is tried to be obtained from the second copy packet. However, the second copy packet does not have a message length. Thus, it is determined that the message length is not normal. The same goes for the case in which the head and second copy packets are discarded and the third copy packet is received.

Thus, when the determination result at step 156 is negative, the head packet has been discarded. Therefore, the UDP analyzing unit 36A sets 1 in the field 56F of the packet discard flag at step 168. When the current packet is a head copy packet, the message length is readable, and therefore the determination result at step 156 is positive. In this case, at step 158, the UDP analyzing unit 36A stores the read message in the field 56J for storing the message length corresponding to the session to which the head packet belongs. At step 160, the UDP analyzing unit 36A performs the setting process of adding the received message length. At step 162, the UDP analyzing unit 36A determines whether the message length is equal to the received message length.

If not all copy packets in the message have been received, the received message length is not equal to the message length. In this case, the determination result at step 162 is negative. At step 164, the UDP analyzing unit 36A determines whether the received message length is still shorter than the message length. For example, when the head packet is received and the second packet is received, the received message length is still shorter than the message length. Therefore, the determination result at step 164 is negative, and the packet discard detection and setting process ends.

On the other hand, if all packets in the message have been received, the received message length is equal to the message length. That is, the determination result at step 162 is positive. In this case, the UDP analyzing unit 36A sets 0 in the field 56K of the received message length at step 166.

On the other hand, as depicted in FIG. 23B, consider the case in which the head packet and the second packet are received but the last (third) packet is discarded. It is assumed herein that the message length is of 3500 bytes, and the head and second packets are 1500 bytes each and the last packet is of 500 bytes. The structure of the second message subsequent to the first message M1 is assumed to be similar to the structure of the first message M1. When the final (third) packet is discarded, the determination result at step 162 is not positive, and the processing of setting 0 in the field 56K of the received message length at step 166 is not performed. In this state, when the head packet of the next second message M2 is received, the received message length is 4500 bytes, which exceeds the message length. Therefore, when the received message length exceeds the message length, it is found that the second packet onward has been discarded. Thus, the UDP analyzing unit 36A sets 1 in the field 56F of the packet discard flag at step 170.

With the above-described process, even if the identification information of the head packet is not present in the head packet, discard of the head packet and discard of the second packet onward is detectable.

Fourthly, in the above example, when a packet is discarded, all of the other packets in the session to which the discarded packet belongs are transmitted to the system analyzing device 10 from a port of a switch different from the switch having the output port. Alternatively, all of the packets are transmitted to the system analyzing device 10 from another port of the same switch having the output port. The embodiment is not restricted to the above example. An object of the disclosed art is to keep communication analysis regarding a copy packet even if disclosed. Therefore, the following is considered.

As described above, a session representing a range covered by communication is identified with five pieces of information, that is, the L4 type, transmission-destination IP address, transmission-destination port number, transmission-source IP address, and transmission-source port number. Here, the range by the communication is widened more than the session. That is, a range irrespective of at least one to four at maximum of these five pieces of information is taken as a sub-session. For example, a range covered by communication irrespective of the L4 type and identifiable with the remaining four pieces of information is taken as a sub-session. A range covered by communication irrespective of the L4 type or transmission-source port number and identifiable with the remaining three pieces of information is taken as a sub-session.

When a packet is discarded, another packet that belongs to the sub-session to which the discarded packet belongs may be transmitted from another port in the other switch of the same switch to the system analyzing device 10.

All documents, patent gazettes, and technical standards described herein are incorporated herein by reference to the extent that it is specifically and individually described that each of the documents, patent gazettes, and technical standards is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A port switching method executed by a processor included in an analysis device coupled to a first port and a second port, each of the first port and the second port being included in at least one of a plurality of switches, the plurality of switches being capable of copying a packet to generate a copy packet, the port switching method comprising:
   receiving a first copy packet from the first port;
   storing a sequence number of a second copy packet in a memory when the second copy packet is received;
   extracting a sequence number of the first copy packet when the first copy packet is received
   determining whether the first copy packet succeeded the second copy packet based on the sequence number of the first copy packet, and based on the sequence number of the second copy packet received before the receiving;
   specifying a target port outputted the first copy packet to the first port, the target port being coupled to the first port and the second port and included in a target switch among the plurality of switches, when it is determined that the first copy packet did not succeed the second copy packet; and
   causing the target switch to transmit, from the target port, a third copy packet generated at the target switch to the analysis device through the second port without passing the first port,
   wherein the determining includes:
   determining that the first copy packet succeeded the second copy packet, when the sequence number of the first copy packet succeeded the sequence number of the second copy packet stored in the memory, and
   determining that the first copy packet did not succeed the second copy packet, when the sequence number of the first copy packet did not succeed the sequence number of the second copy packet stored in the memory.

2. The port switching method according to claim 1, wherein the first copy packet and the second copy packet are part of a message transmitted via packet communication.

3. The port switching method according to claim 1, further comprising:
   determining whether the first copy packet and the second copy packet belong to a same communication session;
   wherein the outputting includes outputting, from the target port, the first packet to the first port when the first packet does not belong to the same communication session as the second packet.

4. The port switching method according to claim 1, further comprising:
   determining whether another switch that outputs the first copy packet exists among the plurality of switches, the another switch being different from the target switch, based on transmission-source information, transmission-destination information, information about a port of a transit switch, and connection information of the analysis device stored in a memory, when the first copy packet did not succeed the second copy packet, and
   wherein the causing includes, when the other switch outputting the first copy packet is present, controlling the target switch so that the first copy packet is outputted to a port of the another switch via which the first copy packet goes, based on the transmission-source information, the transmission-destination information, the information about the port of the transit switch, and the connection information of the analysis device.

5. The port switching method according to claim 4, wherein
   the causing includes
      updating a count corresponding to a relevant switch when the first copy packet did not succeed the second copy packet, and
      displaying the information regarding the switch when the count is equal to or larger than a predetermined count.

6. A port switching method executed by a processor included in an analysis device coupled to a first port and a second port, each of the first port and the second port being included in at least one of a plurality of switches, the plurality of switches being capable of copying a packet to generate a copy packet, the port switching method comprising:
   extracting, from a head copy packet among copy packets associated with a message transmitted via packet communication, a message length and a data length of the head copy packet when the head copy packet is received;
   storing the extracted message length;
   storing the extracted data length of the head copy packet as a received message length; and
   updating the received message length, the received message length is a sum of the length of copy packets associated with the message received so far, when the second copy packet is received,
   receiving a first copy packet which is a part of the message from the first port; determining whether the first copy packet succeeded a second copy packet which is a part of the message based on a data length of the first copy packet, and based on a data length of the second copy packet received before the receiving;
   specifying a target port outputted the first copy packet to the first port, the target port being coupled to the first port and the second port and included in a target switch among the plurality of switches when it is determined that the first copy packet did not succeed the second copy packet; and causing the target switch to transmit, from the target port, a third copy packet generated at the target switch to the analysis device through the second port without passing the first port, wherein the determining includes:
determining that the first copy packet succeeded the second copy packet when the updated received message length is equal to the message length; and
determining that the first copy packet did not succeed the second copy packet when the updated received message length is not equal to the message length.

7. The port switching method according to claim 6, further comprising:
initializing the updated received message length when all of the copy packets associated with the message are received and the updated received message length is equal to the message length.

8. An analysis device coupled to a first port and a second port, each of the first port and the second port being included in at least one of a plurality of switches, the analysis device comprising:
a memory; and
a processor coupled to the memory and configured to:
receive a first copy packet from the first port,
extract a sequence number of the first copy packet when the first copy packet is received,
store a sequence number of a second copy packet in the memory when the second copy packet is received,
determine whether the first copy packet succeeded a second copy packet based on sequence information of the first copy packet and sequence information of a second copy packet received before the first copy packet is received,
specify a target port outputted the first copy packet to the first port, the target port being coupled to the first port and the second port and included in a target switch among the plurality of switches when it is determined that the first copy packet did not succeed the second copy packet, and
cause the target switch to transmit, from the target port, a third copy packet generated at the target switch to the analysis device through the second port without passing the first port,
wherein the processor is configured to:
determine that the first copy packet succeeded the second copy packet, when the sequence number of the first copy packet succeeded the sequence number of the second copy packet stored in the memory, and
determine that the first copy packet did not succeed the second copy packet, when the sequence number of the first copy packet did not succeed the sequence number of the second copy packet stored in the memory.

9. The analysis device according to claim 8, wherein the processor is configured to:
determine whether another switch that outputs the first copy packet exists among the plurality of switches, the another switch being different from the target switch, based on transmission-source information, transmission-destination information, information about a port of a transit switch, and connection information of the analysis device stored in the memory, when it is determined that the first copy packet did not succeed the second copy packet, and when the other switch outputting the first copy packet is present, control the target switch so that the first copy packet is outputted to a port of the another switch via which the first copy packet goes, based on the transmission-source information, the transmission-destination information, the information about the port of the transit switch, and the connection information of the analysis device.

10. The analysis device according to claim 9, wherein the processor is configured to:
update a count corresponding to a relevant switch when it is determined that the first copy packet did not succeed the second copy packet, and
display the information regarding the switch when the count is equal to or larger than a predetermined count.

11. The analysis device according to claim 8, wherein the first copy packet and the second copy packet are part of a message transmitted via packet communication.

12. A non-transitory computer-readable recording medium storing a program causing a computer coupled to a first port and a second port included in at least one of a plurality of switches to execute a process, the process comprising:
receiving a first copy packet from the first port;
extracting a sequence number of the first copy packet when the first copy packet is received;
storing a sequence number of a second copy packet in a memory when the second copy packet is received;
determining whether the first copy packet succeeded a second copy packet based on sequence information of the first copy packet, and based on the sequence information of a second copy packet received before the receiving;
specifying a target port outputted the first copy packet to the first port, the target port being coupled to the first port and the second port and included in a target switch among the plurality of switches when it is determined that the first copy packet did not succeed the second copy packet; and
causing the target switch to transmit, from the target port, a third copy packet generated at the target switch to the analysis device through the second port without passing the first port,
wherein the determining includes:
determining that the first copy packet succeeded the second copy packet, when the sequence number of the first copy packet succeeded the sequence number of the second copy packet stored in the memory, and
determining that the first copy packet did not succeed the second copy packet, when the sequence number of the first copy packet did not succeed the sequence number of the second copy packet stored in the memory.

13. The recording medium according to claim 12, wherein the process further comprising:
determining whether another switch that outputs the first copy packet exists among the plurality of switches, the another switch being different from the target switch, based on transmission-source information, transmission-destination information, information about a port of a transit switch, and connection information of the analysis device stored in a memory, when the first copy packet did not succeed the second copy packet, and
wherein the causing includes, when the other switch outputting the first copy packet is present, controlling the target switch so that the first copy packet is outputted to a port of the another switch via which the first copy packet goes, based on the transmission-source information, the transmission-destination information, the information about the port of the transit switch, and the connection information of the analysis device.

14. The recording medium according to claim 13, wherein the causing includes:
updating a count corresponding to a relevant switch when the first copy packet did not succeed the second copy packet, and
displaying the information regarding the switch when the count is equal to or larger than a predetermined count.

15. The recording medium according to claim 12, wherein the first copy packet and the second copy packet are part of a message transmitted via packet communication.

16. The recording medium according to claim 12, wherein the process further comprising:
determining whether the first copy packet and the second copy packet belong to a same communication session;
wherein the outputting includes outputting, from the target port, the first packet to the first port when the first packet does not belong to the same communication session as the second packet.

* * * * *